(12) United States Patent
Gao et al.

(10) Patent No.: US 12,363,701 B2
(45) Date of Patent: *Jul. 15, 2025

(54) METHOD FOR DETERMINING FREQUENCY DOMAIN LOCATION OF CONTROL RESOURCE SET AND RELATED DEVICE

(71) Applicant: HUAWEI TECHNOLOGIES CO., LTD., Guangdong (CN)

(72) Inventors: Fei Gao, Shanghai (CN); Shujing Yu, Beijing (CN); Xu Zhang, Beijing (CN); Weihua Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,955

(22) Filed: May 7, 2024

(65) Prior Publication Data

US 2024/0365308 A1 Oct. 31, 2024

Related U.S. Application Data

(63) Continuation of application No. 17/360,347, filed on Jun. 28, 2021, now Pat. No. 12,010,676, which is a
(Continued)

(30) Foreign Application Priority Data

Dec. 29, 2018 (CN) .................. 201811642765.X

(51) Int. Cl.
  *H04W 72/1263* (2023.01)
  *H04L 1/1867* (2023.01)
(Continued)

(52) U.S. Cl.
  CPC ....... *H04W 72/1263* (2013.01); *H04L 1/1896* (2013.01); *H04W 72/0453* (2013.01);
(Continued)

(58) Field of Classification Search
  CPC ......... H04W 72/1263; H04W 72/0453; H04W 72/0466; H04W 72/20; H04W 72/23;
(Continued)

(56) References Cited

U.S. PATENT DOCUMENTS

2018/0192383 A1 7/2018 Nam et al.
2018/0279289 A1 9/2018 Islam et al.
(Continued)

FOREIGN PATENT DOCUMENTS

CN 102238750 A 11/2011
CN 105934980 A 9/2016
(Continued)

OTHER PUBLICATIONS

3GPP TS 38.211 V15.3.0 (Sep. 2018), "3rd Generation Partnership Project; Technical Specification Group Radio Access Network; NR; Physical channels and modulation (Release 15)," Sep. 2018, 96 pages.
(Continued)

*Primary Examiner* — Candal Elpenord
(74) *Attorney, Agent, or Firm* — Fish & Richardson P.C.

(57) ABSTRACT

A common CORESET determining method, an apparatus and a non-transitory computer-readable storage medium are provided. The method includes: receiving configuration information, wherein the configuration information indicates where a physical resource block occupied by a first
(Continued)

common control resource set is located in a first downlink bandwidth part; determining a frequency domain resource of the first common control resource set based on a frequency domain resource of the first downlink bandwidth part and the physical resource block occupied by the first common control resource set within the first downlink bandwidth part; and monitoring a physical downlink control channel in the first common control resource set before the first downlink bandwidth part configured by a SIB1 takes effect to obtain scheduling control information. According to this application, complexity of determining a frequency domain location of the first control resource set can be reduced.

20 Claims, 15 Drawing Sheets

Related U.S. Application Data continuation of application No. PCT/CN2019/128916, filed on Dec. 26, 2019.

(51) Int. Cl.
*H04W 72/044* (2023.01)
*H04W 72/0453* (2023.01)
*H04W 72/20* (2023.01)
*H04W 72/23* (2023.01)
*H04W 72/53* (2023.01)

(52) U.S. Cl.
CPC ....... *H04W 72/0466* (2013.01); *H04W 72/20* (2023.01); *H04W 72/23* (2023.01); *H04W 72/53* (2023.01)

(58) Field of Classification Search
CPC ............... H04W 72/53; H04W 72/121; H04W 72/0446; H04L 1/1854; H04L 5/0053; H04L 5/0094; H04L 5/0007; H04L 5/0041; H04L 1/1896
USPC .................................................. 370/329–330
See application file for complete search history.

(56) References Cited

U.S. PATENT DOCUMENTS

| | | | |
|---|---|---|---|
| 2019/0349060 A1 | 11/2019 | Liao et al. | |
| 2020/0196285 A1* | 6/2020 | Zhuang | H04W 72/04 |
| 2020/0252180 A1* | 8/2020 | Takeda | H04W 72/12 |
| 2020/0344034 A1 | 10/2020 | Moon et al. | |
| 2021/0092772 A1* | 3/2021 | Nakashima | H04L 5/001 |
| 2021/0185679 A1 | 6/2021 | Yoshimura et al. | |
| 2021/0227558 A1 | 7/2021 | Matsumura et al. | |

FOREIGN PATENT DOCUMENTS

| | | |
|---|---|---|
| CN | 108365928 A | 8/2018 |
| CN | 108401526 A | 8/2018 |
| CN | 108631934 A | 10/2018 |
| CN | 108737050 A | 11/2018 |
| CN | 108882376 A | 11/2018 |
| WO | 2018059391 A1 | 4/2018 |

OTHER PUBLICATIONS

3GPP TS 38.212 V15.3.0 (Sep. 2018), "3rd Generation Partnership Project; Technical Specification Group Radio Access Network; NR;Multiplexing and channel coding (Release 15)," Sep. 2018, 99 pages.
3GPP TS 38.213 V15.3.0 (Sep. 2018), "3rd Generation Partnership Project; Technical Specification Group Radio Access Network; NR; Physical layer procedures for control (Release 15)," Sep. 2018, 101 pages.
3GPP TS 38.214 V15.3.0 (Sep. 2018), "3rd Generation Partnership Project; Technical Specification Group Radio Access Network; NR; Physical layer procedures for data (Release 15)," Sep. 2018, 96 pages.
3GPP TS 38.300 V15.3.1 (Oct. 2018), "3rd Generation Partnership Project; Technical Specification Group Radio Access Network; NR; NR and NG-RAN Overall Description; Stage 2 (Release 15)," Oct. 2018, 92 pages.
3GPP TS 38.331 V15.3.0 (Sep. 2018), "3rd Generation Partnership Project; Technical Specification Group Radio Access Network; NR; Radio Resource Control (RRC) protocol specification (Release 15)," Sep. 2018, 445 pages.
CATT, "Summary of Offline Discussion on RMSI," 3GPP TSG RAN WG1 Meeting #92bis, R1-1805600, Sanya, China, Apr. 16-20, 2018, 17 pages.
CATT, "Summary of Remaining RMSI Issues," 3GPP TSG RAN WG1 Meeting #94, R1-1809794, Gothenburg, Sweden, Aug. 20-24, 2018, 6 pages.
MediaTek Inc., "Summary of Bandwidth Part Remaining Issues," 3GPP TSG RAN WG1 Meeting #94, R1-1809929, Gothenburg, Sweden, Aug. 20-24, 2018, 19 pages.
Office Action issued in Chinese Application No. 201811642765.X on Apr. 2, 2021, 14 pages (with English translation).
PCT International Search Report and Written Opinion issued in International Application No. PCT/CN2019/128916 on Mar. 17, 2020, 17 pages (with English translation).
Samsung, "CR to 38.213 capturing the RAN1#94bis meeting agreements," 3GPP TSG RAN WG1 Meeting #94bis, R1-1812092, Chengdu, China, Oct. 8-12, 2018, 102 pages.
Extended European Search Report issued in European Application No. 19903925.6 on Feb. 16, 2022, 11 pages.
MediaTek Inc., "Summary of Bandwidth Part Remaining Issues," 3GPP TSG RAN WG1 Meeting #94bis, R1-1811850, Chengdu, China, Oct. 8-12, 2018, 25 pages.
NTT Docomo, Inc., "Discussion on Coreseto," 3GPP TSG RAN WG1 Meeting #95, R1-1813934, Spokane, USA, Nov. 12-16, 2018, 80 pages.
Office Action issued in Chinese Application No. 201811642765.X on Apr. 6, 2022, 6 pages (with English translation).
Huawei et al., "Remaining Issues on Bandwidth Part and CA," 3GPP TSG RAN WG1 Meeting #94, R1-1808104, Gothenburg, Sweden, Aug. 20-24, 2018, 23 pages.
MediaTek Inc., "Summary of Bandwidth Part Remaining Issues," 3GPP TSG RAN WG1 Meeting #94, R1-1809849, Gothenburg, Sweden, Aug. 20-24, 2018, 23 pages.
Office Action issued in Korean Application No. 2021-7023695 on Aug. 17, 2022, 11 pages (with English translation).
Vivo, "Remaining Issues on Bandwidth Parts," 3GPP TSG RAN WG1 Meeting #94bis, R1-1810372, Chengdu, China, Oct. 8-12, 2018, 4 pages.

* cited by examiner

METHOD FOR DETERMINING FREQUENCY DOMAIN LOCATION OF CONTROL RESOURCE SET AND RELATED DEVICE

CROSS-REFERENCE TO RELATED APPLICATIONS

This application is a continuation of U.S. patent application Ser. No. 17/360,347, filed on Jun. 28, 2021, which is a continuation of International Application No. PCT/CN2019/128916, filed on Dec. 26, 2019, which claims priority to Chinese Patent Application No. 201811642765.X, filed on Dec. 29, 2018. All of the afore-mentioned patent applications are hereby incorporated by reference in their entireties.

TECHNICAL FIELD

This application relates to the field of communication technologies, and in particular, to a method for determining a frequency domain location of a control resource set and a related device

BACKGROUND

A common control resource set (commonControlResourceSet) may carry scheduling information of a random access response, a paging message, and a system message. A terminal device may monitor the scheduling information of the random access response, the paging message, and the system message on the common control resource set. A network device may send the scheduling information of the random access response, the paging message, and the system message on the common control resource set. In an existing solution, more than one frequency domain location of the common control resource set is determined, thereby increasing complexity of determining a frequency domain location of the common control resource set.

SUMMARY

Embodiments of this application provide a method for determining a frequency domain location of a control resource set and a related device, to reduce complexity of determining a frequency domain location of a first control resource set.

According to a first aspect, an embodiment of this application provides a possible method for determining a frequency domain location of a control resource set. The method is completed by a terminal device and a network device, and includes:

sending, by the network device, configuration information of a first control resource set to the terminal device before successful initial access of the terminal device; and correspondingly, receiving, by the terminal device, the configuration information of the first control resource set before the successful initial access of the terminal device; and broadcasting, by the network device based on a first common resource block set occupied by the first control resource set, uplink or downlink scheduling control information on a physical downlink control channel before the successful initial access of the terminal device or after the successful initial access of the terminal device; and correspondingly, monitoring, by the terminal device based on the first common resource block set occupied by the first control resource set, the physical downlink control channel before the successful initial access of the terminal device or after the successful initial access of the terminal device, to obtain the uplink or downlink scheduling control information.

A first start common resource block included in the first common resource block set is determined based on a second start common resource block of a first downlink bandwidth part and the configuration information of the first control resource set, and the configuration information is used to indicate where a physical resource block occupied by the first common control resource set is located in a first downlink bandwidth part.

In the first aspect, frequency domain locations of the first control resource set before and after the successful initial access of the terminal device are the same. In this way, the terminal device and the network device need to calculate the frequency domain location of the first control resource set only once, thereby reducing complexity of determining the frequency domain location of the first control resource set.

With reference to the first aspect, optionally, for the terminal device, the successful initial access, defined by the terminal device, of the terminal device is used to indicate one of the following occasions:

an occasion on which the terminal device successfully receives an initially transmitted message 4 and sends an acknowledgement message to the network device;

an occasion on which the terminal device successfully receives, after the terminal device successfully receives an initially transmitted message 4, downlink control information (DCI) scrambled by using a cell radio network temporary identifier (C-RNTI);

an occasion on which the terminal device successfully receives a retransmitted message 4 and sends an acknowledgement message to the network device;

an occasion on which the terminal device successfully receives, after the terminal device successfully receives a retransmitted message 4, DCI scrambled by using a C-RNTI;

an occasion on which the terminal device successfully receives, after successfully receiving an initially transmitted message 4, configuration information used to indicate that DCI scrambled by using a C-RNTI needs to be blindly detected; or an occasion on which the terminal device successfully receives, after successfully receiving a retransmitted message 4, configuration information used to indicate that DCI scrambled by using a C-RNTI needs to be blindly detected.

With reference to the first aspect, optionally, for the network device, the successful initial access, defined by the network device, of the terminal device is used to indicate one of the following occasions:

an occasion on which the network device receives an acknowledgement message that is sent by the terminal device and that is for an initially transmitted message 4 sent by the network device;

an occasion on which the network device receives an acknowledgement message that is sent by the terminal device and that is for a retransmitted message 4 sent by the network device;

an occasion on which the network device sends, to the terminal device after receiving an acknowledgement message that is sent by the terminal device and that is for an initially transmitted message 4 sent by the network device, configuration information used to indicate that DCI scrambled by using a C-RNTI needs to be blindly detected; or an occasion on which the network device sends, to the terminal device after receiving an acknowledgement message that is sent by the terminal device and that is for a retransmitted message 4 sent by the network device, configuration information used to indicate that DCI scrambled by using a C-RNTI needs to be blindly detected.

With reference to the first aspect, optionally, the first downlink bandwidth part is defined based on a control resource set coreset #0 or configured based on a system information block SIB1.

With reference to the first aspect, optionally, an identifier of the first control resource set is not 0.

With reference to the first aspect, optionally, when the first downlink bandwidth part is defined based on the coreset #0, the second start common resource block of the first downlink bandwidth part is determined based on a second start physical resource block of the first downlink bandwidth part and a first offset, where the first offset is used to indicate a quantity of physical resource blocks between the second start physical resource block and a reference point, the reference point is a common reference point for resource block grids, and the reference point is used to indicate a center of a subcarrier 0 of a common resource block CRB 0 configured at a preset subcarrier spacing.

With reference to the first aspect, optionally, the first offset is determined based on a second offset between the second start physical resource block of the first downlink bandwidth part and a third start physical resource block of an SS/PBCH block and a common resource block offset of the SS/PBCH block, where the second offset is used to indicate a quantity of physical resource blocks PRBs between the second start physical resource block and the third start physical resource block of the SS/PBCH block; and the common resource block offset of the SS/PBCH block is used to indicate a quantity of physical resource blocks between the third start physical resource block and the reference point.

With reference to the first aspect, optionally, when the first downlink bandwidth part is configured based on the SIB1, the second start common resource block of the first downlink bandwidth part is determined based on the second start physical resource block of the first downlink bandwidth part and a third offset, where the third offset is used to indicate the quantity of physical resource blocks between the second start physical resource block and the reference point, the reference point is the common reference point for the resource block grids, and the reference point is used to indicate the center of the subcarrier 0 of the common resource block CRB 0 configured at the preset subcarrier spacing.

According to a second aspect, an embodiment of this application provides another possible method for determining a frequency domain location of a control resource set. The method is completed by a terminal device and a network device, and includes:

sending, by the network device, configuration information of a first control resource set to the terminal device before successful initial access of the terminal device; and correspondingly, receiving, by the terminal device, the configuration information of the first control resource set before the successful initial access of the terminal device;

skipping, by the network device, broadcasting, based on a common resource block set occupied by the first control resource set, uplink or downlink scheduling control information on a physical downlink control channel before the successful initial access of the terminal device; and correspondingly, skipping, by the terminal device, monitoring, based on the common resource block set occupied by the first control resource set, the physical downlink control channel before the successful initial access of the terminal device; and broadcasting, by the network device based on a first common resource block set occupied by the first control resource set, the uplink or downlink scheduling control information on the physical downlink control channel after the successful initial access of the terminal device; and correspondingly, monitoring, by the terminal device based on the first common resource block set occupied by the first control resource set, the physical downlink control channel after the successful initial access of the terminal device, to obtain the uplink or downlink scheduling control information.

A first start common resource block included in the first common resource block set is determined based on a second start common resource block of a first downlink bandwidth part and the configuration information of the first control resource set, and the configuration information is used to indicate where a physical resource block occupied by the first control resource set is located in the first downlink bandwidth part.

In the second aspect, neither the network device nor the terminal device needs to determine a frequency domain location of the first control resource set before the successful initial access of the terminal device, and the frequency domain location that is of the first control resource set and that is after the initial access of the terminal device is determined by using a referenced downlink bandwidth part. In this way, the terminal device and the network device need to calculate the frequency domain location of the first control resource set only once, thereby reducing complexity of determining the frequency domain location of the first control resource set.

With reference to the second aspect, optionally, for the terminal device, the successful initial access, defined by the terminal device, of the terminal device is used to indicate one of the following occasions:

an occasion on which the terminal device successfully receives an initially transmitted message 4 and sends an acknowledgement message to the network device;

an occasion on which the terminal device successfully receives, after the terminal device successfully receives an initially transmitted message 4, downlink control information (DCI) scrambled by using a cell radio network temporary identifier (C-RNTI);

an occasion on which the terminal device successfully receives a retransmitted message 4 and sends an acknowledgement message to the network device;

an occasion on which the terminal device successfully receives, after the terminal device successfully receives a retransmitted message 4, DCI scrambled by using a C-RNTI;

an occasion on which the terminal device successfully receives, after successfully receiving an initially transmitted message 4, configuration information used to indicate that DCI scrambled by using a C-RNTI needs to be blindly detected; or an occasion on which the terminal device successfully receives, after successfully receiving a retransmitted message 4, configuration information used to indicate that DCI scrambled by using a C-RNTI needs to be blindly detected.

With reference to the second aspect, optionally, for the network device, the successful initial access, defined by the network device, of the terminal device is used to indicate one of the following occasions:
- an occasion on which the network device receives an acknowledgement message that is sent by the terminal device and that is for an initially transmitted message 4 sent by the network device;
- an occasion on which the network device receives an acknowledgement message that is sent by the terminal device and that is for a retransmitted message 4 sent by the network device;
- an occasion on which the network device sends, to the terminal device after receiving an acknowledgement message that is sent by the terminal device and that is for an initially transmitted message 4 sent by the network device, configuration information used to indicate that DCI scrambled by using a C-RNTI needs to be blindly detected; or
- an occasion on which the network device sends, to the terminal device after receiving an acknowledgement message that is sent by the terminal device and that is for a retransmitted message 4 sent by the network device, configuration information used to indicate that DCI scrambled by using a C-RNTI needs to be blindly detected.

With reference to the second aspect, optionally, the first downlink bandwidth part is defined based on a control resource set coreset #0 or configured based on a system information block SIB1.

With reference to the second aspect, optionally, an identifier of the first control resource set is not 0.

With reference to the second aspect, optionally, when the first downlink bandwidth part is defined based on the coreset #0, the second start common resource block of the first downlink bandwidth part is determined based on a second start physical resource block of the first downlink bandwidth part and a first offset.

The first offset is used to indicate a quantity of physical resource blocks between the second start physical resource block and a reference point, the reference point is a common reference point for resource block grids, and the reference point is used to indicate a center of a subcarrier 0 of a common resource block CRB 0 configured at a preset subcarrier spacing.

With reference to the second aspect, optionally, the first offset is determined based on a second offset between the second start physical resource block of the first downlink bandwidth part and a third start physical resource block of an SS/PBCH block and a common resource block offset of the SS/PBCH block, where the second offset is used to indicate a quantity of physical resource blocks PRBs between the second start physical resource block and the third start physical resource block of the SS/PBCH block; and the common resource block offset of the SS/PBCH block is used to indicate a quantity of physical resource blocks between a common resource block corresponding to the third start physical resource block and the reference point.

With reference to the second aspect, optionally, when the first downlink bandwidth part is configured based on the SIB1, the second start common resource block of the first downlink bandwidth part is determined based on the second start physical resource block of the first downlink bandwidth part and a third offset, where the third offset is used to indicate the quantity of physical resource blocks between the second start physical resource block and the reference point, the reference point is the common reference point for the resource block grids, and the reference point is used to indicate the center of the subcarrier 0 of the common resource block CRB 0 configured at the preset subcarrier spacing.

According to a third aspect, an embodiment of this application provides a possible method for determining a frequency domain location of a control resource set. The method is completed by a terminal device and a network device, and includes:
- sending, by the network device, configuration information of a first control resource set to the terminal device before successful initial access of the terminal device; and
- correspondingly, receiving, by the terminal device, the configuration information of the first control resource set before the successful initial access of the terminal device;
- broadcasting, by the network device based on a first common resource block set occupied by the first control resource set, uplink or downlink scheduling control information on a physical downlink control channel before the successful initial access of the terminal device; and correspondingly, monitoring, by the terminal device based on the first common resource block set occupied by the first control resource set, the physical downlink control channel before the successful initial access of the terminal device, to obtain the uplink or downlink scheduling control information, where a first start common resource block included in the first common resource block set is determined based on a second start common resource block of a first downlink bandwidth part and the configuration information of the first control resource set, and the configuration information is used to indicate where a physical resource block occupied by the first control resource set is located in the first downlink bandwidth part; and
- broadcasting, by the network device based on a third common resource block set occupied by the first control resource set, the uplink or downlink scheduling control information on the physical downlink control channel after the successful initial access of the terminal device; and correspondingly, monitoring, by the terminal device based on the third common resource block set occupied by the first control resource set, the physical downlink control channel after the successful initial access of the terminal device, to obtain the uplink or downlink scheduling control information, where a third start common resource block included in the third common resource block set is determined based on a fourth start common resource block of a second downlink bandwidth part and the configuration information of the first control resource set, and the configuration information is used to indicate where a physical resource block occupied by the first control resource set is located in the second downlink bandwidth part; and
- the second start common resource block of the first downlink bandwidth part is the same as the fourth start common resource block of the second downlink bandwidth part.

In the third aspect, before and after the successful initial access of the terminal device, frequency domain locations of the first control resource set may be determined based on frequency domain locations of different downlink bandwidth parts. However, because it is specified that locations of start common resource blocks of the different downlink bandwidth parts are the same, the frequency domain locations of the first control resource set that use the different downlink bandwidth parts as references may still be the same. In this way, the terminal device and the network device need to calculate the frequency domain location of the first control resource set only once, thereby reducing complexity of determining the frequency domain location of the first control resource set.

With reference to the third aspect, optionally, for the terminal device, the successful initial access, defined by the terminal device, of the terminal device is used to indicate one of the following occasions:

an occasion on which the terminal device successfully receives an initially transmitted message 4 and sends an acknowledgement message to the network device;

an occasion on which the terminal device successfully receives, after the terminal device successfully receives an initially transmitted message 4, downlink control information (DCI) scrambled by using a cell radio network temporary identifier (C-RNTI);

an occasion on which the terminal device successfully receives a retransmitted message 4 and sends an acknowledgement message to the network device;

an occasion on which the terminal device successfully receives, after the terminal device successfully receives a retransmitted message 4, DCI scrambled by using a C-RNTI;

when common resource blocks occupied by the first downlink bandwidth part and the second downlink bandwidth part are different, a switching completion occasion on which the terminal device switches from the first downlink bandwidth part to the second downlink bandwidth part after successfully receiving an initially transmitted message 4 and sending an acknowledgement message to the network device;

when common resource blocks occupied by the first downlink bandwidth part and the second downlink bandwidth part are different, a switching completion occasion on which the terminal device switches from the first downlink bandwidth part to the second downlink bandwidth part after successfully receiving a retransmitted message 4 and sending an acknowledgement message to the network device;

when common resource blocks occupied by the first downlink bandwidth part and the second downlink bandwidth part are different, an occasion on which the terminal device successfully receives, after the terminal device successfully receives an initially transmitted message 4 and switches from the first downlink bandwidth part to the second downlink bandwidth part, DCI scrambled by using a C-RNTI;

when common resource blocks occupied by the first downlink bandwidth part and the second downlink bandwidth part are different, an occasion on which the terminal device successfully receives, after the terminal device successfully receives a retransmitted message 4 and switches from the first downlink bandwidth part to the second downlink bandwidth part, DCI scrambled by using a C-RNTI;

when common resource blocks occupied by the first downlink bandwidth part and the second downlink bandwidth part are different, an occasion on which the terminal device receives, after successfully receiving an initially transmitted message 4 and switching from the first downlink bandwidth part to the second downlink bandwidth part, configuration information used to indicate that DCI scrambled by using a C-RNTI needs to be blindly detected; or when common resource blocks occupied by the first downlink bandwidth part and the second downlink bandwidth part are different, an occasion on which the terminal device receives, after successfully receiving a retransmitted message 4 and switching from the first downlink bandwidth part to the second downlink bandwidth part, configuration information used to indicate that DCI scrambled by using a C-RNTI needs to be blindly detected.

With reference to the third aspect, optionally, for the network device, the successful initial access, defined by the network device, of the terminal device is used to indicate one of the following occasions:

an occasion on which the network device receives an acknowledgement message that is sent by the terminal device and that is for an initially transmitted message 4 sent by the network device;

an occasion on which the network device receives an acknowledgement message that is sent by the terminal device and that is for a retransmitted message 4 sent by the network device;

an occasion on which the network device sends, to the terminal device after receiving an acknowledgement message that is sent by the terminal device and that is for an initially transmitted message 4 sent by the network device, configuration information used to indicate that DCI scrambled by using a C-RNTI needs to be blindly detected;

an occasion on which the network device sends, to the terminal device after receiving an acknowledgement message that is sent by the terminal device and that is for a retransmitted message 4 sent by the network device, configuration information used to indicate that DCI scrambled by using a C-RNTI needs to be blindly detected;

when common resource blocks occupied by the first downlink bandwidth part and the second downlink bandwidth part are different, a switching completion occasion on which the network device switches from the first downlink bandwidth part to the second downlink bandwidth part after receiving an acknowledgement message that is sent by the terminal device and that is for an initially transmitted message 4 sent by the network device;

when common resource blocks occupied by the first downlink bandwidth part and the second downlink bandwidth part are different, a switching completion occasion on which the network device switches from the first downlink bandwidth part to the second downlink bandwidth part after receiving an acknowledgement message that is sent by the terminal device and that is for a retransmitted message 4 sent by the network device;

when common resource blocks occupied by the first downlink bandwidth part and the second downlink bandwidth part are different, an occasion on which the network device sends, to the terminal device after receiving an acknowledgement message that is sent by the terminal device and that is for an initially transmitted message 4 sent by the network device and switching from the first downlink bandwidth part to the second downlink bandwidth part, configuration information used to indicate that DCI scrambled by using a C-RNTI needs to be blindly detected; or when common resource blocks occupied by the first downlink bandwidth part and the second downlink bandwidth part are different, an occasion on which the network device sends, to the terminal device after receiving an acknowledgement message that is sent by the terminal device and that is for a retransmitted message 4 sent by the network device and switching from the first downlink bandwidth part to the second downlink bandwidth part, configuration information used to indicate that DCI scrambled by using a C-RNTI needs to be blindly detected.

With reference to the third aspect, optionally, the first downlink bandwidth part is defined based on a control resource set coreset #0, and the second downlink bandwidth part is configured based on a system information block SIB1.

With reference to the third aspect, optionally, an identifier of the first control resource set is not 0.

With reference to the third aspect, optionally, when the first downlink bandwidth part is defined based on the coreset #0, the second start common resource block of the first downlink bandwidth part is determined based on a second start physical resource block of the first downlink bandwidth part and a first offset, where the first offset is used to indicate a quantity of physical resource blocks between the second start physical resource block and a reference point, the reference point is a common reference point for resource block grids, and the reference point is used to indicate a center of a subcarrier 0 of a common resource block CRB 0 configured at a preset subcarrier spacing.

With reference to the third aspect, optionally, the first offset is determined based on a second offset between the second start physical resource block of the first downlink bandwidth part and a third start physical resource block of an SS/PBCH block and a common resource block offset of the SS/PBCH block, where the second offset is used to indicate a quantity of physical resource blocks PRBs between the second start physical resource block and the third start physical resource block of the SS/PBCH block; and the common resource block offset of the SS/PBCH block is used to indicate a quantity of physical resource blocks between the third start physical resource block and the reference point.

With reference to the third aspect, optionally, when the second downlink bandwidth part is configured based on the SIB1, the fourth start common resource block of the second downlink bandwidth part is determined based on a fourth start physical resource block of the second downlink bandwidth part and a third offset, where the third offset is used to indicate a quantity of physical resource blocks between the fourth start physical resource block and the reference point, the reference point is the common reference point for the resource block grids, and the reference point is used to indicate the center of the subcarrier 0 of the common resource block CRB 0 configured at the preset subcarrier spacing.

According to a fourth aspect, an embodiment of this application provides a possible method for determining a frequency domain location of a control resource set. The method is completed by a terminal device and a network device, and includes:

sending, by the network device, configuration information of a first control resource set to the terminal device after successful initial access of the terminal device; and correspondingly, receiving, by the terminal device, the configuration information of the first control resource set after the successful initial access of the terminal device; and broadcasting, by the network device based on a first common resource block set occupied by the first control resource set, uplink or downlink scheduling control information on a physical downlink control channel after the successful initial access of the terminal device; and correspondingly, monitoring, by the terminal device based on the first common resource block set occupied by the first control resource set, the physical downlink control channel after the successful initial access of the terminal device, to obtain the uplink or downlink scheduling control information.

A first start common resource block included in the first common resource block set is determined based on a second start common resource block of a first downlink bandwidth part and the configuration information of the first control resource set, and the configuration information is used to indicate where a physical resource block occupied by the first control resource set is located in the first downlink bandwidth part.

In the fourth aspect, neither the network device nor the terminal device needs to determine a frequency domain location of the first control resource set before the successful initial access of the terminal device, and the frequency domain location that is of the first control resource set and that is after the initial access of the terminal device is determined by using a referenced downlink bandwidth part. In this way, the terminal device and the network device need to calculate the frequency domain location of the first control resource set only once, thereby reducing complexity of determining the frequency domain location of the first control resource set.

With reference to the fourth aspect, optionally, for the terminal device, the successful initial access, defined by the terminal device, of the terminal device is used to indicate one of the following occasions:

an occasion on which the terminal device successfully receives an initially transmitted message 4 and sends an acknowledgement message to the network device;

an occasion on which the terminal device successfully receives, after the terminal device successfully receives an initially transmitted message 4, downlink control information (DCI) scrambled by using a cell radio network temporary identifier (C-RNTI);

an occasion on which the terminal device successfully receives a retransmitted message 4 and sends an acknowledgement message to the network device;

an occasion on which the terminal device successfully receives, after the terminal device successfully receives a retransmitted message 4, DCI scrambled by using a C-RNTI;

an occasion on which the terminal device receives, after successfully receiving an initially transmitted message 4, configuration information used to indicate that DCI scrambled by using a C-RNTI needs to be blindly detected; or an occasion on which the terminal device receives, after successfully receiving a retransmitted message 4, configuration information used to indicate that DCI scrambled by using a C-RNTI needs to be blindly detected.

With reference to the fourth aspect, optionally, for the network device, the successful initial access, defined by the network device, of the terminal device is used to indicate one of the following occasions:

an occasion on which the network device receives an acknowledgement message that is sent by the terminal device and that is for an initially transmitted message 4 sent by the network device;

an occasion on which the network device receives an acknowledgement message that is sent by the terminal device and that is for a retransmitted message 4 sent by the network device;

an occasion on which the network device sends, to the terminal device after receiving an acknowledgement message that is sent by the terminal device and that is for an initially transmitted message 4 sent by the network device, configuration information used to indicate that DCI scrambled by using a C-RNTI needs to be blindly detected; or an occasion on which the network device sends, to the terminal device after receiving an acknowledgement message that is sent by the terminal device and that is for a retransmitted message 4 sent by the network device, configuration information used to indicate that DCI scrambled by using a C-RNTI needs to be blindly detected.

With reference to the fourth aspect, optionally, the first downlink bandwidth part is configured based on a system information block SIB1 or another message for configuring a downlink bandwidth part after the successful initial access of the terminal device.

With reference to the fourth aspect, optionally, an identifier of the first control resource set is not 0.

With reference to the fourth aspect, optionally, when the first downlink bandwidth part is configured based on the SIB1, the second start common resource block of the first downlink bandwidth part is determined based on a second start physical resource block of the first downlink bandwidth part and a third offset.

The third offset is used to indicate a quantity of physical resource blocks between the second start physical resource block and a reference point, the reference point is a common reference point for resource block grids, and the reference point is used to indicate a center of a subcarrier 0 of a common resource block CRB 0 configured at a preset subcarrier spacing.

With reference to the fourth aspect, optionally, the configuration information of the first control resource set and configuration information of the first downlink bandwidth part are received simultaneously.

According to a fifth aspect, an embodiment of this application provides an apparatus for determining a frequency domain location of a control resource set. The apparatus may be a terminal device, or may be a chip in a terminal device. The apparatus may include a processing unit and a transceiver unit. When the apparatus is the terminal device, the processing unit may be a processor, and the transceiver unit may be a transceiver. The terminal device may further include a storage unit, and the storage unit may be a memory. The storage unit is configured to store instructions, and the processing unit executes the instructions stored in the storage unit, so that the terminal device performs the method performed by the terminal device in any one of the first aspect to the fourth aspect or any possible implementation thereof. When the apparatus is the chip in the terminal device, the processing unit may be a processor, and the transceiver unit may be an input/output interface, a pin, a circuit, or the like. The processing unit executes instructions stored in a storage unit, so that the terminal device performs the method performed by the terminal device in any one of the first aspect to the fourth aspect or any possible implementation thereof. The storage unit may be a storage unit (for example, a register or a cache) in the chip, or may be a storage unit (for example, a read-only memory or a random access memory) located outside the chip and in the terminal device.

According to a sixth aspect, an embodiment of this application provides an apparatus for determining a frequency domain location of a control resource set. The apparatus may be a network device, or may be a chip in a network device. The apparatus may include a processing unit and a transceiver unit. When the apparatus is the network device, the processing unit may be a processor, and the transceiver unit may be a transceiver. The network device may further include a storage unit, and the storage unit may be a memory. The storage unit is configured to store instructions, and the processing unit executes the instructions stored in the storage unit, so that the network device performs the method performed by the network device in any one of the first aspect to the fourth aspect or any possible implementation thereof. When the apparatus is the chip in the network device, the processing unit may be a processor, and the transceiver unit may be an input/output interface, a pin, a circuit, or the like. The processing unit executes instructions stored in a storage unit, so that the network device performs the method performed by the network device in any one of the first aspect to the fourth aspect or any possible implementation thereof. The storage unit may be a storage unit (for example, a register or a cache) in the chip, or may be a storage unit (for example, a read-only memory or a random access memory) located outside the chip and in the network device.

According to a seventh aspect, an embodiment of this application provides a computer program product. The computer program product includes computer program code. When the computer program code is run on a computer, the computer is enabled to perform the method performed by the terminal device in any one of the first aspect to the fourth aspect or any possible implementation thereof.

According to an eighth aspect, an embodiment of this application provides a computer program product. The computer program product includes computer program code. When the computer program code is run on a computer, the computer is enabled to perform the method performed by the network device in any one of the first aspect to the fourth aspect or any possible implementation thereof.

According to a ninth aspect, an embodiment of this application provides a computer-readable medium. The computer-readable medium stores program code. When the computer program code is run on a computer, the computer is enabled to perform the method performed by the terminal device in any one of the first aspect to the fourth aspect or any possible implementation thereof.

According to a tenth aspect, an embodiment of this application provides a computer-readable medium. The computer-readable medium stores program code. When the computer program code is run on a computer, the computer is enabled to perform the method performed by the network device in any one of the first aspect to the fourth aspect or any possible implementation thereof.

BRIEF DESCRIPTION OF DRAWINGS

To describe the technical solutions in the embodiments of this application more clearly, the following describes the accompanying drawings used in describing the embodiments of this application.

DESCRIPTION OF EMBODIMENTS

The following describes the embodiments of this application with reference to the accompanying drawings in the embodiments of this application.

Figure 1:
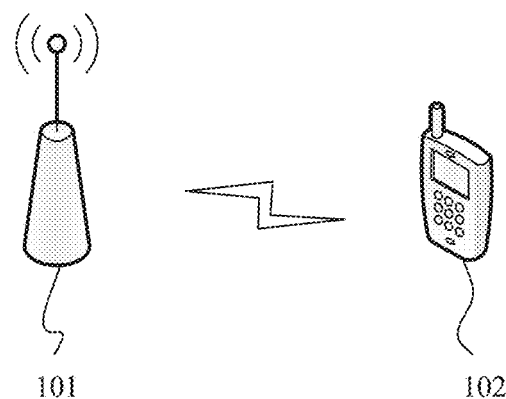
FIG. 1 is a possible schematic architectural diagram of a communication system according to an embodiment of this application.

FIG. 1 is a possible schematic architectural diagram of a communication system according to an embodiment of this application. As shown in FIG. 1, the communication system includes a network device 101 and a terminal device 102. The network device 101 and the terminal device 102 may communicate with each other by using an air interface technology of the communication system. The communication includes a scenario in which uplink or downlink scheduling control information is transmitted on a physical downlink control channel (PDCCH).

The PDCCH includes a time-frequency location of a commonControlResourceSet. A frequency domain location of the commonControlResourceSet, namely, a location of a common resource block (CRB), is determined by using a current active downlink bandwidth part as a reference. For example, when the current active downlink bandwidth part is an initial downlink bandwidth part, the location of the CRB in the commonControlResourceSet is determined by using the initial downlink bandwidth part as a reference. The terminal device may monitor the physical downlink control channel at the frequency domain location of the commonControlResourceSet to obtain the uplink or downlink scheduling control information. The network device may send the uplink or downlink scheduling control information on the physical downlink control channel at the frequency domain location of the commonControlResourceSet. For example, the uplink or downlink scheduling control information may be control information for scheduling a random access response, control information for scheduling a paging message, or control information for scheduling a system message.

In an existing technical solution, there are two configuration manners for the initial downlink bandwidth part (initial DL BWP). One configuration manner is defining the initial downlink bandwidth part by using a CORESET #0. In this case, a size and a frequency domain location of the initial downlink bandwidth part are the same as those of the CORESET #0. The CORESET is a control resource set. The other configuration manner is configuring the initial DL BWP in a system information block 1 (SIB1). Before successful initial access of the terminal device, the initial downlink bandwidth part defined by using the CORESET #0 takes effect. After the successful initial access of the terminal device, the initial DL BWP configured in the SIB1 takes effect. The initial DL BWP configured in the SIB1 may be different from the initial DL BWP defined by using the CORESET #0, but a frequency domain location of the initial DL BWP configured in the SIB1 needs to include a frequency domain location of the CORESET #0.

Figure 2:
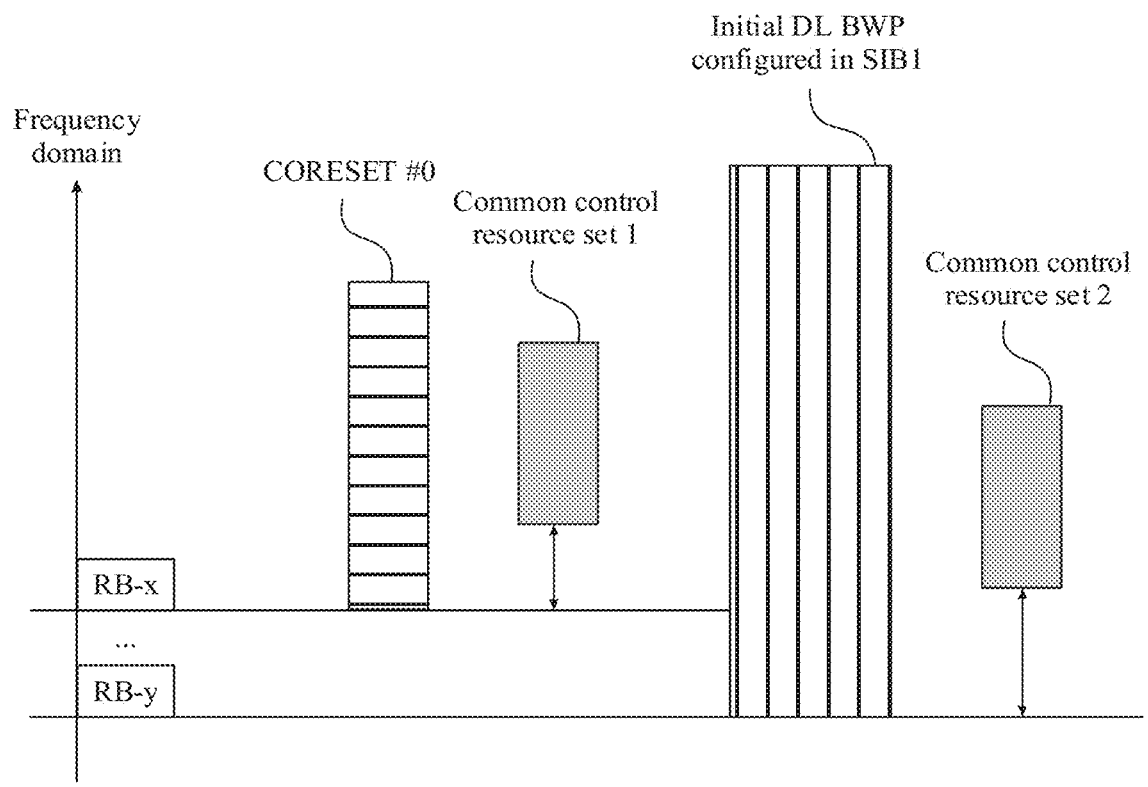
FIG. 2 is a possible example diagram of frequency domain locations of common control resource sets according to an embodiment of this application.

When the frequency domain location of the CORESET #0 is inconsistent with the frequency domain location of the initial DL BWP configured in the SIB1, frequency domain locations of the commonControlResourceSet that are separately determined by using the two configurations are also different. FIG. 2 is a possible example diagram of frequency domain locations of common control resource sets according to an embodiment of this application.

As shown in FIG. 2, it can be learned that a frequency domain location of a CORESET #0 is inconsistent with a frequency domain location of an initial DL BWP configured in a SIB1, and a start resource block location RB-x of the CORESET #0 is different from a start resource block location RB-y of the initial DL BWP configured in the SIB1. In this case, a start resource block location that is of a commonControlResourceSet 1 and that is determined based on an initial downlink bandwidth part defined by using the CORESET #0 is also different from a start resource block location that is of a commonControlResourceSet 2 and that is determined based on the initial DL BWP configured in the SIB1.

Before successful initial access of a terminal device, the terminal device monitors control information for scheduling a random access response, a paging message, a system message, and the like based on a frequency domain location of the commonControlResourceSet 1. After the successful initial access of the terminal device, the terminal device monitors the information for scheduling the random access response, the paging message, the system message, and the like based on a frequency domain location of the commonControlResourceSet 2.

In coverage of a network device, if there is a terminal device whose initial access is successful and a terminal device whose access is unsuccessful, the network device needs to send, at the frequency domain location of the commonControlResourceSet 1, the scheduling information of the random access response, the paging message, the system message, and the like to the terminal device whose access is unsuccessful, and needs to send, at the frequency domain location of the commonControlResourceSet 2, the scheduling information of the random access response, the paging message, the system message, and the like to the terminal device whose initial access is successful.

It can be learned that, in the scenario in FIG. 2, in an existing solution, frequency domain locations of a commonControlResourceSet that are obtained through calculation before and after the successful initial access of the terminal device are different. Consequently, same common information is sent on different frequency domain resources, and both the terminal device and the network device separately calculate the frequency domain locations of the commonControlResourceSet depending on whether the access is successful, thereby increasing complexity of determining the frequency domain locations of the commonControlResourceSet.

In embodiments in FIG. 3 to FIG. 15 in this application, frequency domain locations of a commonControlResourceSet that are obtained through calculation before and after successful initial access of a terminal device may be the same. In this way, the terminal device and a network device need to calculate the frequency domain location of the commonControlResourceSet only once, thereby reducing complexity of determining the frequency domain location of the commonControlResourceSet. For details, refer to the following detailed descriptions of the embodiments in FIG. 3 to FIG. 15 in this application.

A terminal device in this application may be user equipment (UE), or may be a handheld terminal, a notebook computer, a subscriber unit, a cellular phone, a smartphone, a personal digital assistant (PDA) computer, a tablet computer, a wireless modem, a handheld device, a laptop computer, a cordless phone, a wireless local loop (WLL) station, a machine type communication (MTC) terminal, or another device that can access a mobile network. The terminal device and a network device communicate with each other by using an air interface technology.

A network device in this application may be an access network device, and is mainly responsible for functions such as radio resource management, quality of service (QOS) management, and data compression and encryption on an air interface side. The network device may include base stations in various forms, such as a macro base station, a micro base station (also referred to as a small cell), a relay station, and an access point. In systems that use different radio access technologies, names of a device that has a base station function may be different. For example, in a fifth generation (5G) system, the device is referred to as a gNB; in a fourth generation (4G) system, the device is referred to as an evolved NodeB (eNB or eNodeB).

It may be understood that a first control resource set in this application may alternatively be a common control resource set or a control resource set named in another manner. This is not limited in the embodiments of this application.

The embodiments of this application may alternatively be applied to another communication system in which a frequency domain location of a control resource set needs to be determined. Terms "system" and "network" may be interchanged with each other. The system architecture described in the embodiments of this application aims to describe the technical solutions in the embodiments of this application, but do not constitute a limitation on the technical solutions provided in the embodiments of this application. A person of ordinary skill in the art may know that, as a network architecture evolves, the technical solutions provided in the embodiments of this application are also applicable to a similar technical problem. In the descriptions of this application, "a plurality of" means two or more, and "at least two" means two or more.

The following describes specific implementations of the embodiments of this application.

Figure 3:
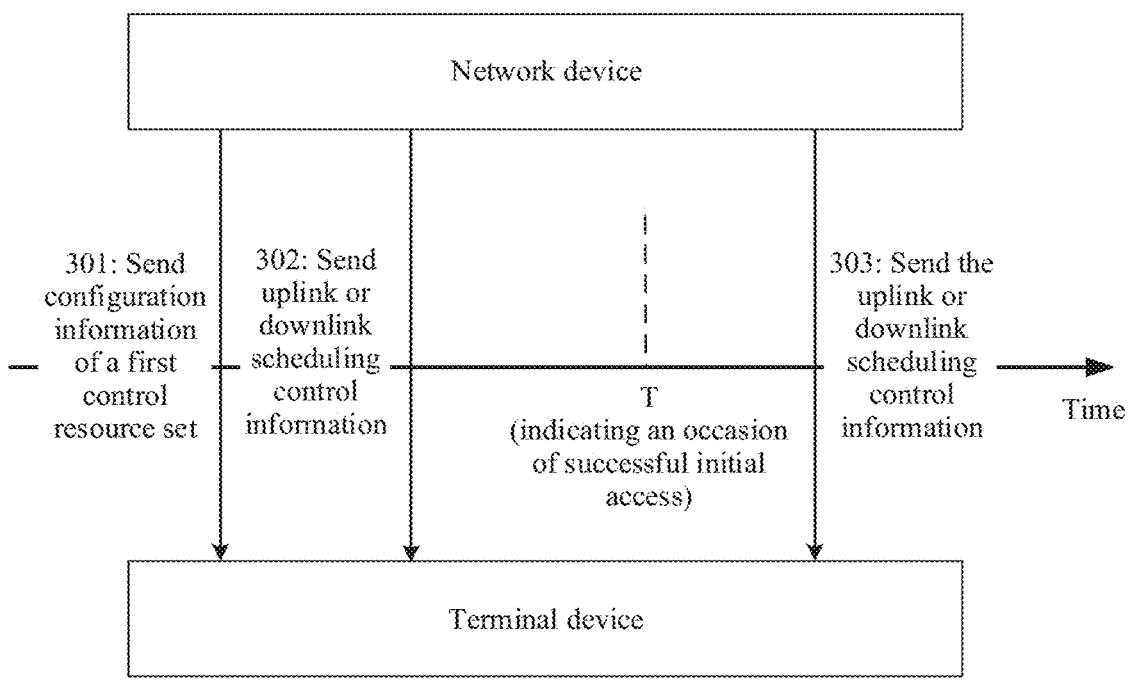
FIG. 3 is a schematic flowchart of a method for determining a frequency domain location of a control resource set according to an embodiment of this application.

Based on the communication system shown in FIG. 1, FIG. 3 is a schematic flowchart of a method for determining a frequency domain location of a control resource set according to an embodiment of this application. The method shown in FIG. 3 includes step 301 to step 303.

301: The network device sends configuration information of a first control resource set to the terminal device before successful initial access of the terminal device.

Correspondingly, the terminal device receives the configuration information of the first control resource set before the successful initial access of the terminal device.

302: The network device sends, based on a first common resource block set occupied by the first control resource set, the uplink or downlink scheduling control information on the physical downlink control channel before the successful initial access of the terminal device.

Correspondingly, the terminal device monitors, based on the first common resource block set occupied by the first control resource set, the physical downlink control channel before the successful initial access of the terminal device, to obtain the uplink or downlink scheduling control information.

303: The network device sends, based on the first common resource block set occupied by the first control resource set, the uplink or downlink scheduling control information on the physical downlink control channel after the successful initial access of the terminal device.

Correspondingly, the terminal device monitors, based on the first common resource block set occupied by the first control resource set, the physical downlink control channel after the successful initial access of the terminal device, to obtain the uplink or downlink scheduling control information.

Because a quantity of pieces of uplink or downlink scheduling control information sent by the network device is uncertain, a quantity of execution times of step 302 and step 303 is not limited in this embodiment of this application.

The configuration information is used to indicate where a physical resource block (PRB) occupied by the first control resource set is located in a first downlink bandwidth part. An identifier of the first control resource set in this application is not 0.

Optionally, the configuration information of the first control resource set may be obtained from a SIB1, and the configuration information may take effect both before and after the successful initial access of the terminal device.

Taking effect herein means that the terminal device may monitor the physical downlink control channel based on a frequency domain location of the first control resource set, to obtain the uplink or downlink scheduling control information, or the network device may send the uplink or downlink scheduling control information on the physical downlink control channel based on a frequency domain location of the first control resource set.

Optionally, in a scenario in which the first downlink bandwidth part is an initial DL BWP configured in the SIB1, configuration information of the first downlink bandwidth part may also be obtained from the SIB1, but the configuration information of the first downlink bandwidth part configured in the SIB1 takes effect after the successful initial access of the terminal device. Taking effect herein means that downlink control information may be received based on a frequency domain location of the first downlink bandwidth part configured in the SIB1, or the network device may send downlink control information based on a frequency domain location of the first downlink bandwidth part configured in the SIB1. The terminal device may determine the frequency domain location of the first downlink bandwidth part by using one piece of higher layer signaling locationAndBandwidth and/or another parameter of the first downlink bandwidth part.

The first common resource block set occupied by the first control resource set includes a first start common resource block and another common resource block occupied by the first control resource set. In this embodiment of this application, both the network device and the terminal device may determine the first start common resource block, and may determine, based on the configuration information and a start common resource block of a referenced downlink bandwidth part, the common resource blocks that are occupied by the first control resource set and that start from the first start common resource block. How to determine the first start common resource block may be described in the following two cases (an $A1^{th}$ case and an $A2^{th}$ case).

Figure 4:
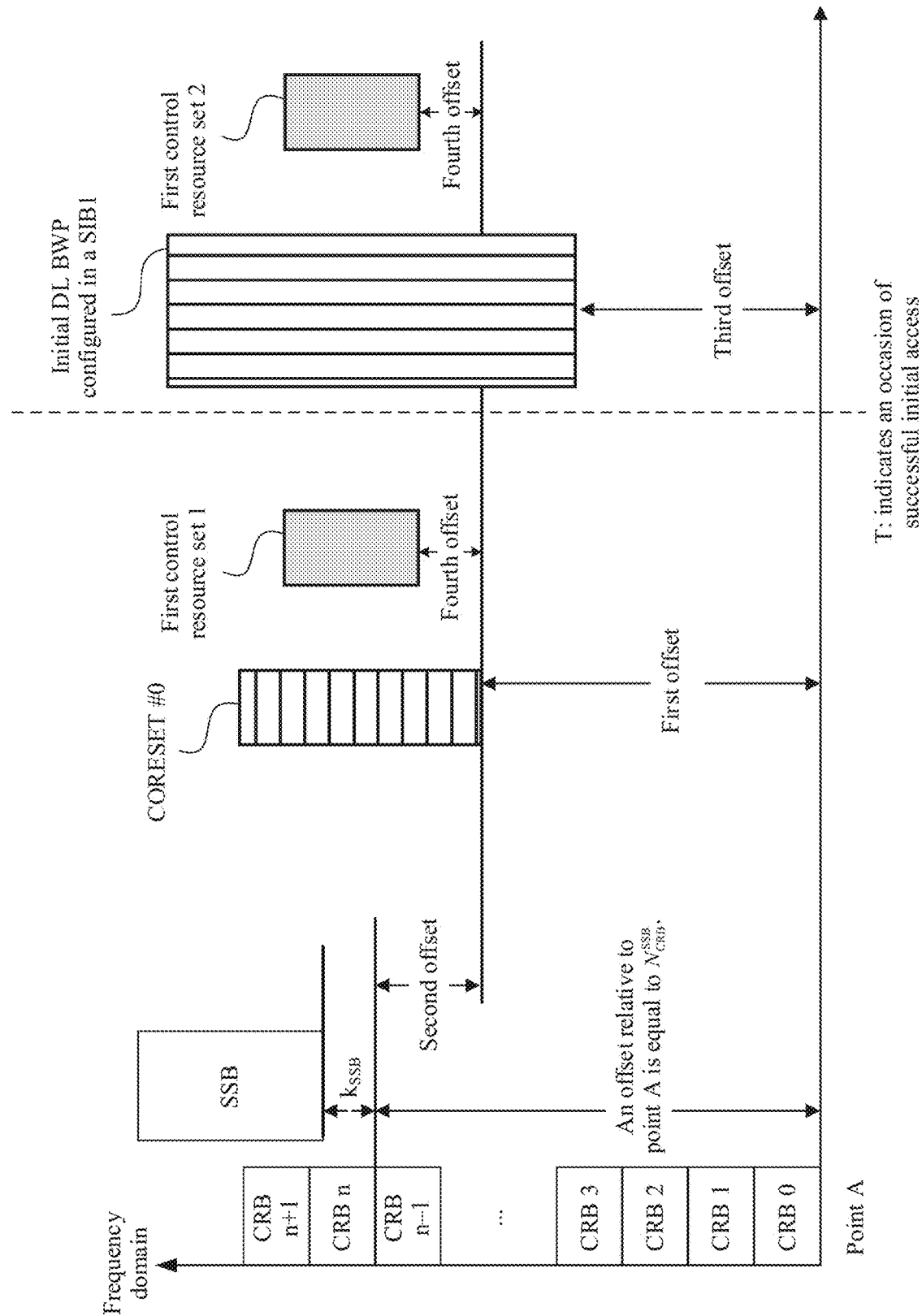
FIG. 4 is an example diagram of frequency domain locations of control resource sets according to an embodiment of this application.

In the $A1^{th}$ case, FIG. 4 is an example diagram of frequency domain locations of control resource sets according to an embodiment of this application. In FIG. 4, a first downlink bandwidth part is an initial DL BWP defined by using a CORESET #0, and a first start common resource block of a first control resource set is determined based on a second start common resource block of the CORESET #0 and configuration information of the first control resource set. Specifically, for a detailed process of determining the first start common resource block after the second start common resource block of the CORESET #0 is determined, refer to detailed descriptions in FIG. 6. A fourth offset refers to a quantity of common resource blocks between the second start common resource block of the CORESET #0 and the first start common resource block of the first control resource set.

The second start common resource block of the CORESET #0 is a lowest CRB occupied by the CORESET #0. The first start common resource block of the first control resource set is a lowest CRB occupied by the first control resource set. The second start common resource block of the CORESET #0 is determined based on a second start physical resource block of the CORESET #0 and a first offset. The first offset is used to indicate a quantity of physical resource blocks between the second start physical resource block and a reference point. The reference point is a common reference point for resource block grids. The reference point is used to indicate a center of a subcarrier 0 of a common resource block CRB 0 configured at a preset subcarrier spacing. As shown in FIG. 4, the common reference point may be a location of a point A, and indicates the center of the subcarrier 0 of the common resource block CRB 0.

The first offset is determined based on a second offset between the second start physical resource block of the first downlink bandwidth part and a third start physical resource block of a synchronous/physical broadcast channel block (SS/PBCH block) and a common resource block offset of the SS/PBCH block. The second offset is used to indicate a quantity of physical resource blocks between the second start physical resource block and the third start physical resource block of the SS/PBCH block. The common resource block offset of the SS/PBCH block is used to indicate a quantity of physical resource blocks between the third start physical resource block and the reference point. As shown in FIG. 4, an offset relative to point A (offsetToPointA) is equal to $N_{CRB}^{SSB}$. In this way, the first offset is equal to a value obtained by subtracting the second offset from $N_{CRB}^{SSB}$. The third start physical resource block is an RB that has a smallest RB index value and that is in CRBs overlapping the first RB of the SS/PBCH block.

Herein, only a manner of determining the second start common resource block of the CORESET #0 is briefly described. For further details, refer to detailed descriptions in FIG. 8.

Based on the $A1^{th}$ case, optionally, during actual application, the first downlink bandwidth part may be defined by using only the CORESET #0. In this way, a frequency domain location of the first control resource set can be determined by using only the first downlink bandwidth part defined by using the CORESET #0. Alternatively, optionally, during actual application, the first downlink bandwidth part may be defined by using the CORESET #0, and the first downlink bandwidth part may be configured in a SIB1. In this case, the first downlink bandwidth part defined by using the CORESET #0 is selected to determine a frequency domain location of the first control resource set.

Before successful initial access of a terminal device, the terminal device may obtain the configuration information of the first control resource set from a SIB1 message. Before the successful initial access of the terminal device, a network device may use the SIB1 message to carry the configuration information of the first control resource set. The terminal device and the network device may determine a first start common resource location of the first control resource set based on the second start common resource block of the CORESET #0. Before the successful initial access of the terminal device, the terminal device monitors a physical downlink control channel based on a first control resource set 1 shown in FIG. 4, to obtain uplink or downlink scheduling control information, and the network device sends the uplink or downlink scheduling control information on the physical downlink control channel based on the first control resource set 1 shown in FIG. 4. After the successful initial access of the terminal device, the terminal device monitors the physical downlink control channel based on a first control resource set 2 shown in FIG. 4, to obtain the uplink or downlink scheduling control information, and the network device sends the uplink or downlink scheduling control information on the physical downlink control channel based on the first control resource set 2 shown in FIG. 4. Frequency domain locations of the first control resource set that are determined in this manner are the same, and the terminal device and the network device need to calculate the location of the first control resource set only once, thereby reducing complexity of determining the frequency domain location of the first control resource set.

An occasion of determining the frequency domain location of the first control resource set is not limited in this embodiment of this application. The frequency domain location of the first control resource set may be determined before the successful initial access of the terminal device and based on the configuration information and a frequency domain location of the first downlink bandwidth part defined by using the CORESET #0. Alternatively, the frequency domain location of the first control resource set may be determined after the successful initial access and based on the configuration information and a frequency domain location of the first downlink bandwidth part defined by using the CORESET #0.

Figure 5:
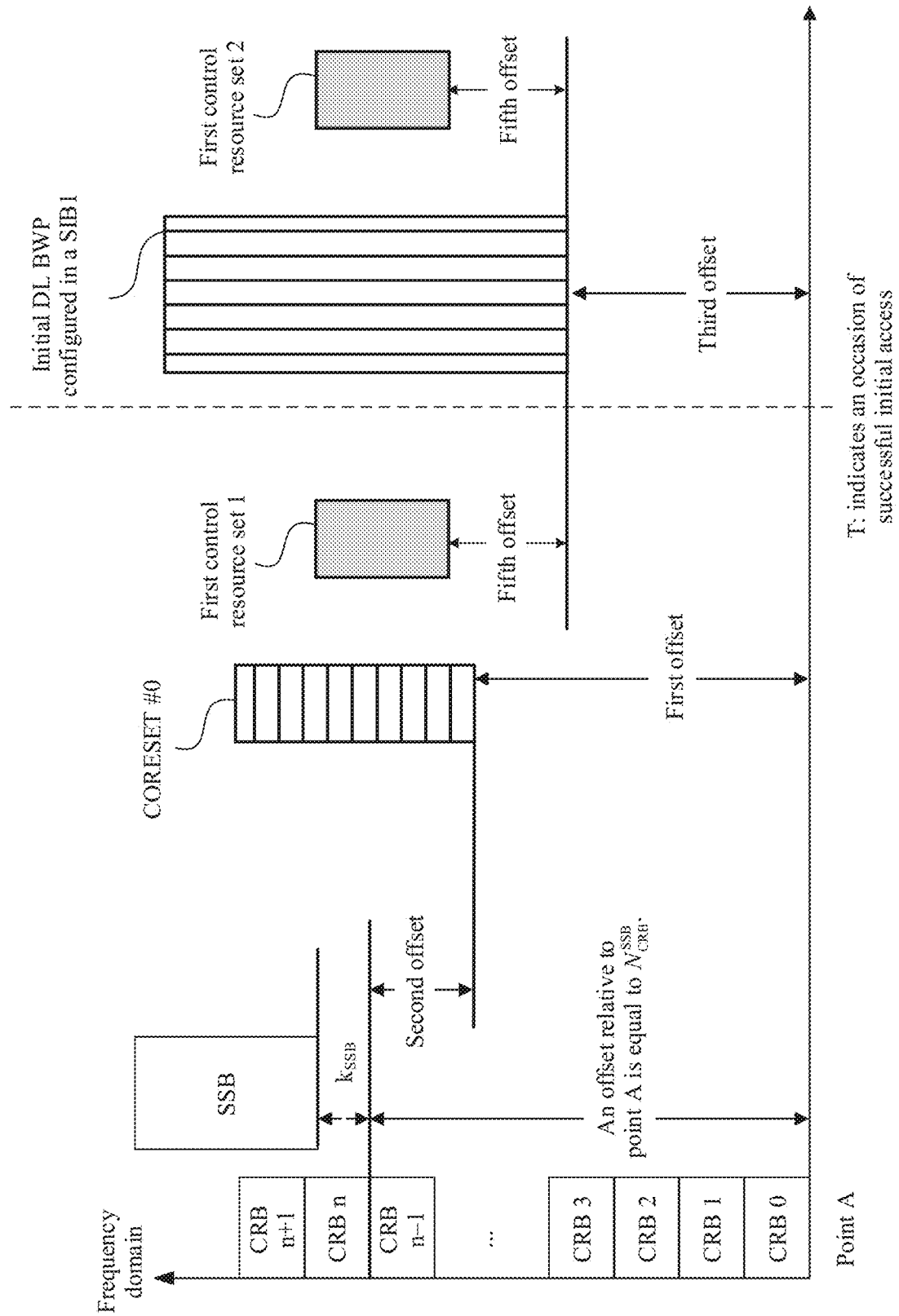
FIG. 5 is an example diagram of frequency domain locations of control resource sets according to an embodiment of this application.

In the A2$^{th}$ case, FIG. 5 is another example diagram of frequency domain locations of control resource sets according to an embodiment of this application. In FIG. 5, a first downlink bandwidth part is an initial DL BWP configured in a SIB1, and a first start common resource block of a first control resource set is determined based on a second start common resource block of the first downlink bandwidth part configured in the SIB1 and configuration information of the first control resource set. Specifically, for a detailed process of determining the first start common resource block of the first control resource set after the second start common resource block of the first downlink bandwidth part configured in the SIB1 is determined, refer to detailed descriptions in FIG. 6. A fifth offset refers to a quantity of common resource blocks between the second start common resource block of the first downlink bandwidth part configured in the SIB1 and the first start common resource block of the first control resource set.

In a case that the first downlink bandwidth part is configured based on the SIB1, the second start common resource block of the first downlink bandwidth part is determined based on a second start physical resource block of the first downlink bandwidth part and a third offset. The third offset is used to indicate a quantity of physical resource blocks between the second start physical resource block and a reference point. The reference point is a common reference point for resource block grids. The reference point is used to indicate a center of a subcarrier 0 of a common resource block CRB 0 configured at a preset subcarrier spacing. As shown in FIG. 5, the common reference point may be a point A, and indicates the center of the subcarrier 0 of the common resource block CRB 0. Herein, only a manner of determining the second start common resource block of the first downlink bandwidth part configured in the SIB1 is briefly described. For details, refer to detailed descriptions in FIG. 8.

Based on the A2$^{th}$ case, optionally, for actual application, there may be only one manner of configuring the first downlink bandwidth part, to be specific, by using the SIB1. In this case, a frequency domain location of the first control resource set can be determined by using only the first downlink bandwidth part configured in the SIB1. Alternatively, optionally, for actual application, the first downlink bandwidth part may be configured by using a CORESET #0 and the SIB1. In this case, the first downlink bandwidth part configured in the SIB1 is selected to determine a frequency domain location of the first control resource set.

Before successful initial access of a terminal device, the terminal device may obtain the configuration information of the first control resource set from a SIB1 message. Before the successful initial access of the terminal device, a network device may use the SIB1 message to carry the configuration information of the first control resource set. The terminal device and the network device may determine a first start common resource location of the first control resource set based on the second start common resource block of the first downlink bandwidth part configured in the SIB1. Before the successful initial access of the terminal device, the terminal device monitors a physical downlink control channel based on a first control resource set 1 shown in FIG. 5, to obtain uplink or downlink scheduling control information, and the network device sends the uplink or downlink scheduling control information on the physical downlink control channel based on the first control resource set 1 shown in FIG. 5. After the successful initial access of the terminal device, the terminal device monitors the physical downlink control channel based on a first control resource set 2 shown in FIG. 5, to obtain the uplink or downlink scheduling control information, and the network device sends the uplink or downlink scheduling control information on the physical downlink control channel based on the first control resource set 2 shown in FIG. 5. Frequency domain locations of the first control resource set that are determined in this manner are the same, and the terminal device and the network device need to calculate the location of the first control resource set only once, thereby reducing complexity of determining the frequency domain location of the first control resource set.

An occasion on which the terminal device determines the frequency domain location of the first control resource set is not limited in this embodiment of this application. The frequency domain location of the first control resource set may be determined before the successful initial access of the terminal device and based on the configuration information and a frequency domain location of the first downlink bandwidth part configured in the SIB1. Alternatively, the frequency domain location of the first control resource set may be determined after the successful initial access of the terminal device and based on the configuration information and a frequency domain location of the first downlink bandwidth part configured in the SIB1.

An occasion T in FIG. 3, FIG. 4, and FIG. 5 indicates an occasion of the successful initial access of the terminal device. The network device and the terminal device may define the occasion T differently. In an optional implementation, the terminal device determines that the occasion of the successful initial access is used to indicate one of the following occasions (3-1), (3-2), (3-3), (3-4), (3-5), or (3-6), where (3-1): an occasion on which the terminal device successfully receives an initially transmitted message 4 and sends an acknowledgement message to the network device;

(3-2): an occasion on which the terminal device successfully receives, after the terminal device successfully receives an initially transmitted message 4, downlink control information (DCI) scrambled by using a cell radio network temporary identifier (C-RNTI);

(3-3): an occasion on which the terminal device successfully receives a retransmitted message 4 and sends an acknowledgement message to the network device;

(3-4): an occasion on which the terminal device successfully receives, after the terminal device successfully receives a retransmitted message 4, DCI scrambled by using a C-RNTI;

(3-5): an occasion on which the terminal device successfully receives, after successfully receiving an initially transmitted message 4, configuration information used to indicate that DCI scrambled by using a C-RNTI needs to be blindly detected; or (3-6): an occasion on which the terminal device successfully receives, after successfully receiving a retransmitted message 4, configuration information used to indicate that DCI scrambled by using a C-RNTI needs to be blindly detected.

The network device determines that the occasion of the successful initial access is used to indicate one of the following occasions (3-7), (3-8), (3-9), or (3-10), where (3-7): an occasion on which the network device receives an acknowledgement message that is sent by the terminal device and that is for an initially transmitted message 4 sent by the network device;

(3-8): an occasion on which the network device receives an acknowledgement message that is sent by the terminal device and that is for a retransmitted message 4 sent by the network device;

(3-9): an occasion on which the network device sends, to the terminal device after receiving an acknowledgement message that is sent by the terminal device and that is for an initially transmitted message 4 sent by the network device, configuration information used to indicate that DCI scrambled by using a C-RNTI needs to be blindly detected; or (3-10): an occasion on which the network device sends, to the terminal device after receiving an acknowledgement message that is sent by the terminal device and that is for a retransmitted message 4 sent by the network device, configuration information used to indicate that DCI scrambled by using a C-RNTI needs to be blindly detected.

In this embodiment of this application, frequency domain locations of the first control resource set before and after the successful initial access of the terminal device are the same. In this way, the terminal device and the network device need to calculate the frequency domain location of the first control resource set only once, thereby reducing complexity of determining the frequency domain location of the first control resource set.

Figure 6:
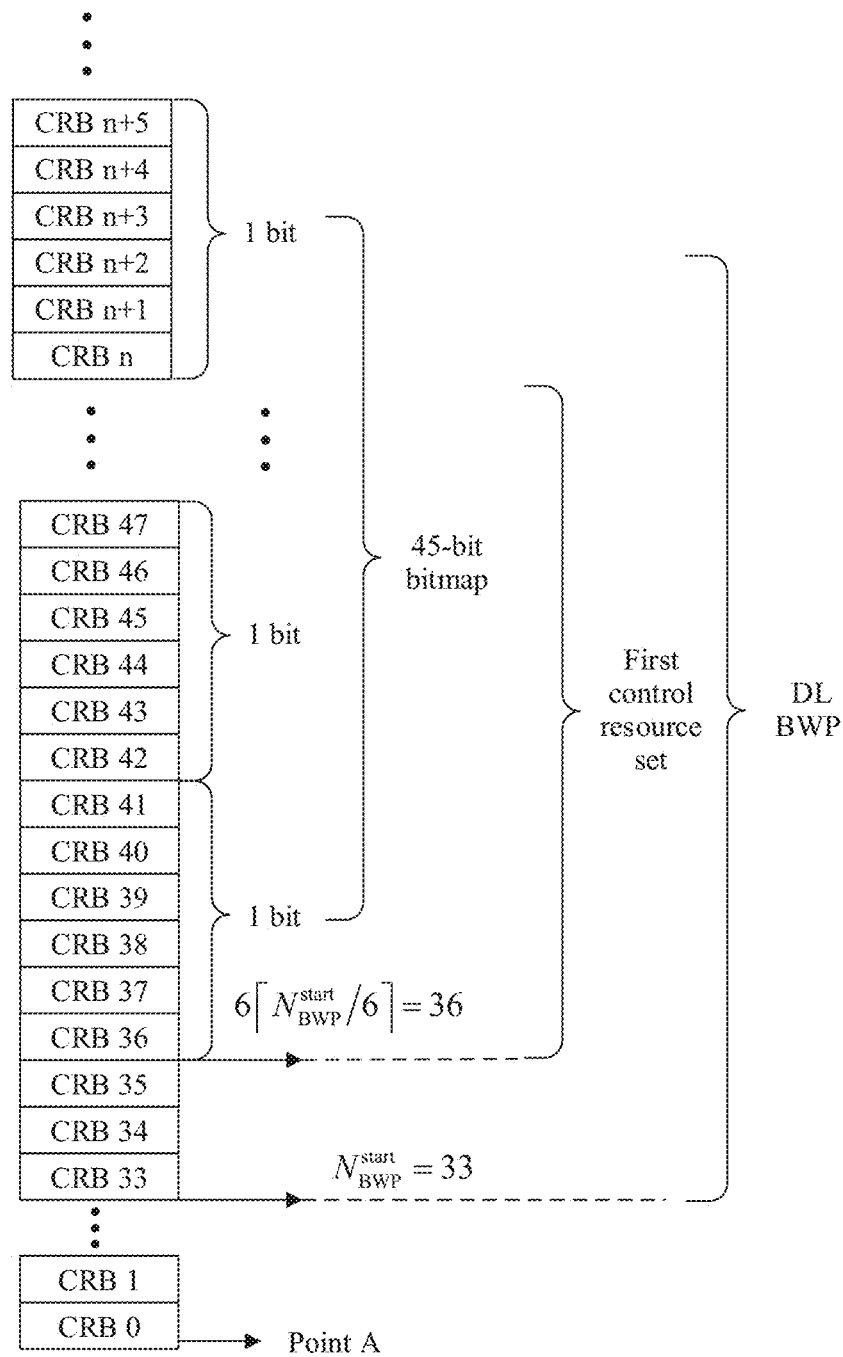
FIG. 6 is an example diagram of a frequency domain location of a downlink bandwidth part and a frequency domain location of a first control resource set according to an embodiment of this application.

FIG. 6 is an example diagram of a frequency domain location of a downlink bandwidth part and a frequency domain location of a first control resource set according to this application. In one DL BWP of one cell, a network device may indicate resource allocation of the first control resource set in the BWP by using higher layer signaling frequencyDomainResources. The "frequencyDomainResources" herein is configuration information of the first control resource set in this application. According to a description in a protocol, the frequencyDomainResources is a 45-bit bitmap (bit-map). The 45-bit bitmap indicates frequency domain resource allocation of the first control resource set in a first downlink bandwidth part, and each bit indicates six consecutive non-overlapping physical resource blocks (PRB). An index of a first start common resource block of the first control resource set is aligned with an index that is of a common resource block and that is a multiple of 6.

As shown in FIG. 6, assuming that an index of a start common resource block of the downlink bandwidth part is $N_{BWP}^{start}$=CRB 33, because the index of the first start common resource block of the first control resource set needs to be the multiple of 6, a start common resource block of the frequencyDomainResources is $6\lceil N_{BWP}^{start}/6\rceil$=CRB 36. Specifically, six PRBs indicated by the first bit of the 45-bit bitmap are successively arranged in ascending order from CRB 36. If a value of a bit is 1, it indicates that six corresponding consecutive PRBs are allocated to the first control resource set. If a value of a bit is 0, it indicates that six corresponding consecutive PRBs are not allocated to the first control resource set. If a PRB part indicated by a bit exceeds the downlink bandwidth part, an excess part is set to 0, indicating that the excess part is not allocated to the first control resource set.

For example, when frequencyDomainResources= "00000111111110 . . . ", it may be learned that all 30 PRBs corresponding to the first five bits are not allocated to the first control resource set, and the index of the first start common resource block of the first control resource set is 36+30=66, that is, the first start common resource block of the first control resource set is CRB 66. When the downlink bandwidth part in FIG. 6 is the first downlink bandwidth part defined by using the CORESET #0 in the case shown in FIG. 4, the fourth offset in FIG. 4 may be CRB 66-CRB 33=CRB 33. Specifically, there are 33 common resource blocks between the first start common resource block of the first control resource set and the start common resource block of the downlink bandwidth part.

Optionally, the downlink bandwidth part (DL BWP) in FIG. 6 may be an initial downlink bandwidth part defined by using the CORESET #0, may be an initial downlink bandwidth part configured by using a SIB1, may be a newly configured initial DL BWP, or may be another DL BWP or the like. For all the various possible configuration cases of the downlink bandwidth part, refer to how to determine the first start common resource block of the first control resource set based on the start common resource block of the downlink bandwidth part and the configuration information of the first control resource set in FIG. 6.

Figure 7:
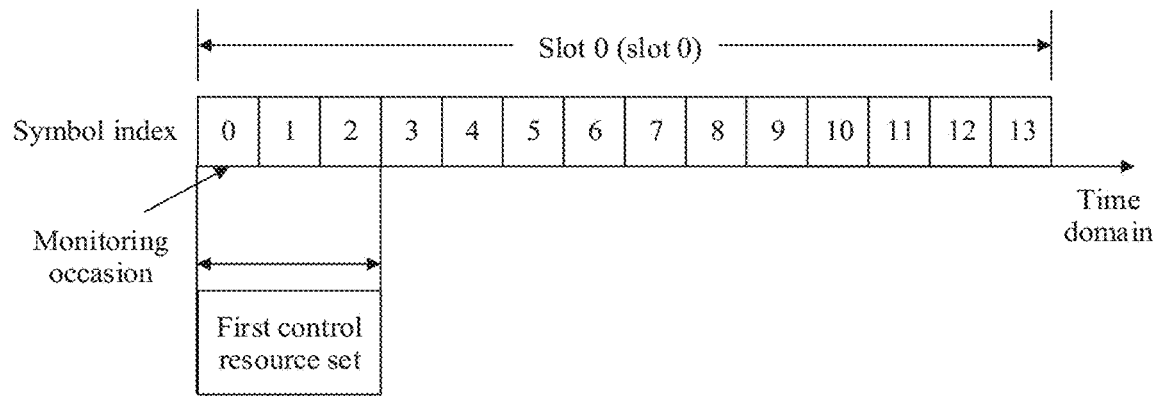
FIG. 7 is an example diagram of a time domain location and a frequency domain location of a first control resource set according to an embodiment of this application.

Further, FIG. 7 is an example diagram of a time domain resource of a first control resource set according to an embodiment of this application. During specific implementation, a network device may configure a first control resource set for a terminal device by using higher layer signaling (for example, radio resource control (RRC) signaling), namely, a configuration message of the first control resource set. The configuration message includes parameters such as a CORESET ID of the first control resource set, a frequency domain resource indication of the first control resource set, and a quantity of OFDM symbols of the first control resource set in time domain. The quantity of OFDM symbols of the first control resource set in time domain may be one of 1, 2, and 3. The frequency domain resource indication may be the 45-bit bitmap shown in FIG. 6. The network device configures a search space set for the terminal device by using higher layer signaling (for example, RRC signaling), namely, a SearchSpace configuration message. The SearchSpace configuration message includes parameters such as a search space set ID, a monitoring occasion indication in a slot, an aggregation level, and a quantity of corresponding candidate PDCCHs. For example, a time domain location of the first control resource set in which blind detection is performed in search space is shown in FIG. 7. A monitoring occasion indication of the search space in a slot 0 is on the first symbol in the slot 0. In addition, the first control resource set corresponding to the CORESET ID in the search space lasts for three symbols in time domain, for example, a symbol 0 to a symbol 2 in FIG. 7. A frequency domain resource location of the first control resource set is determined by using the 45-bit bitmap. In addition, for a specific process of determining a frequency domain location of the first control resource set, refer to the descriptions of the method shown in FIG. 6.

Figure 8:
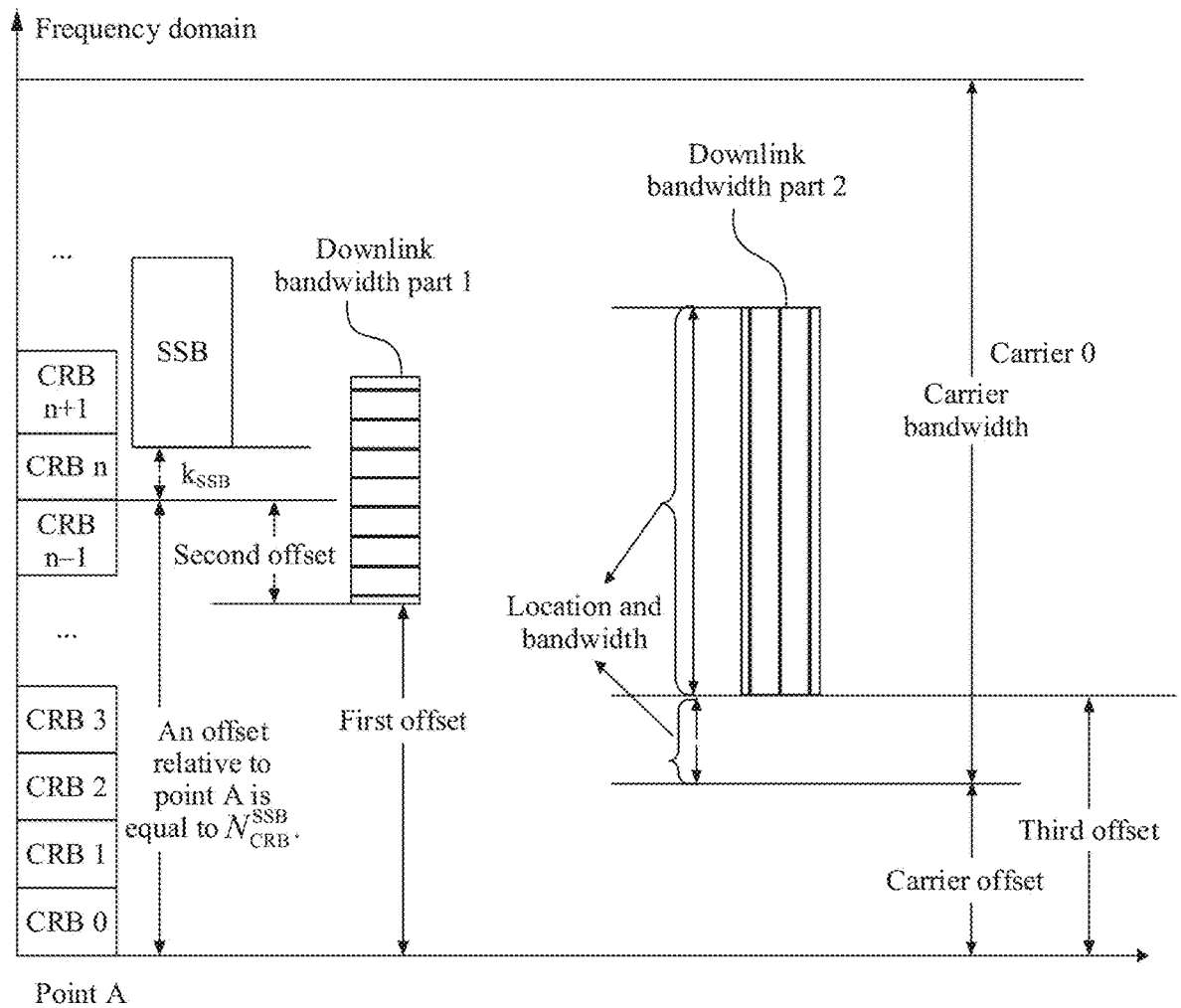
FIG. 8 is an example diagram of determining frequency domain locations of downlink bandwidth parts according to an embodiment of this application.

When a downlink bandwidth part is defined by using a CORESET #0 or configured in a SIB1, assuming that an initial downlink bandwidth part defined by using the CORESET #0 is represented by a downlink bandwidth part 1, and assuming that an initial downlink bandwidth part configured in the SIB1 is represented by a downlink bandwidth part 2, for a detailed process of determining frequency domain locations of the downlink bandwidth part 1 and the downlink bandwidth part 2, refer to detailed descriptions in FIG. 8. For ease of application to the embodiments, a common resource block of the downlink bandwidth part 1 herein is represented by a fifth common resource block, and the fifth common resource block includes a fifth start common resource block and another common resource block occupied by the downlink bandwidth part 1; a common resource block of the downlink bandwidth part 2 herein is represented by a sixth common resource block, and the sixth common resource block includes a sixth start common resource block and another common resource block occupied by the downlink bandwidth part 2.

(1) After the terminal device detects an SS/PBCH block in operating bandwidth, an ssb-SubcarrierOffset ($K_{SSB}$) in a MIB indicates a subcarrier offset between an RB that has a smallest RB index value and that is in CRBs overlapping the first RB of the SS/PBCH block and the first RB of the SS/PBCH block. The RB that has the smallest index value and that is in the CRBs overlapping the first RB of the SS/PBCH block is a third start physical resource block of the SS/PBCH block in this application.

(2) Four most significant bits of a pdcch-ConfigSIB1 in the MIB are obtained, and the four most significant bits indicate a second offset between the SS/PBCH block and the downlink bandwidth part 1.

The second offset herein is a quantity of physical resource blocks between a fifth start physical resource block of the downlink bandwidth part 1 and the third start physical resource block of the SS/PBCH block, and the second offset is in a unit of PRB.

In this way, the fifth start physical resource block of the downlink bandwidth part 1 may be determined based on the third start physical resource block of the SS/PBCH block and the second offset.

(3) DCI format 1_0 scrambled by using a SI-RNTI is monitored in the downlink bandwidth part 1, to obtain scheduling information of the SIB1, and a SIB1 message is received on a scheduled time-frequency resource. The following information may be obtained by obtaining a ServingCellConfigCommonSIB in the SIB1 message.

I. Offset relative to point A (offsetToPointA): The offsetToPointA is used to indicate a PRB offset from a third start physical resource location of a cell-defining SS/PBCH block to a point A. The third start physical resource location herein refers to the CRB that corresponds to the smallest index value and that overlaps with the first RB of the SS/PBCH block.

In this way, a third start common resource block of the SS/PBCH block may be determined based on the offsetToPointA and the third start physical resource location in the SS/PBCH block. The third start common resource block is the CRB that has the smallest index value and that overlaps with the first RB of the SS/PBCH block.

Further, a first offset may be determined by using the offsetToPointA and the second offset in (2), and the fifth start common resource block of the downlink bandwidth part 1 may be determined based on the first offset and the fifth start physical resource block of the downlink bandwidth part 1. The fifth start common resource block is a lowest common resource block occupied by the downlink bandwidth part 1.

II. locationAndBandwidth: The locationAndBandwidth is used to indicate information such as a start physical resource block of the downlink bandwidth part 2 and a quantity of the common resource blocks occupied by the downlink bandwidth part 2, as shown in FIG. 8.

III. carrierBandwidth: The carrierBandwidth is used to indicate a group of carriers corresponding to different subcarrier spacings and a width of each carrier in frequency domain.

OffsetToCarrier: The OffsetToCarrier is used to indicate a frequency domain offset from a lowest available subcarrier of each carrier to the point A, where the point A is a center of a subcarrier 0 of a common RB.

In this way, the sixth start common resource block of the downlink bandwidth part 2 and the another common resource block occupied by the downlink bandwidth part 2 may be determined with reference to II and III. The sixth start common resource block is a lowest common resource block occupied by the downlink bandwidth part 2.

The resource block grid in the embodiments of this application is used to map a physical resource. When resource mapping is performed at a physical layer, a basic unit is a time-frequency resource element (RE). One RE consists of one symbol in time domain and one subcarrier in frequency domain. One resource block (RB) includes all OFDM symbols in one slot and 12 subcarriers in frequency domain. A location of the RE is represented by using (k, l). k represents a sequence number of the OFDM symbol, l represents a sequence number of the subcarrier, and a specified RE may be located by providing coordinates (k, l).

Optionally, before the initial access of the terminal device, when the network device configures the configuration information of the first control resource set, the terminal device may obtain the configuration information of the first control resource set by using the ServingCellConfigCommonSIB in the SIB1 message, and may further determine the first start common resource block that is of the first control resource set and that uses the downlink bandwidth part 1 as a reference, or determine the first start common resource block that is of the first control resource set and that uses the downlink bandwidth part 2 as a reference.

Figure 9:
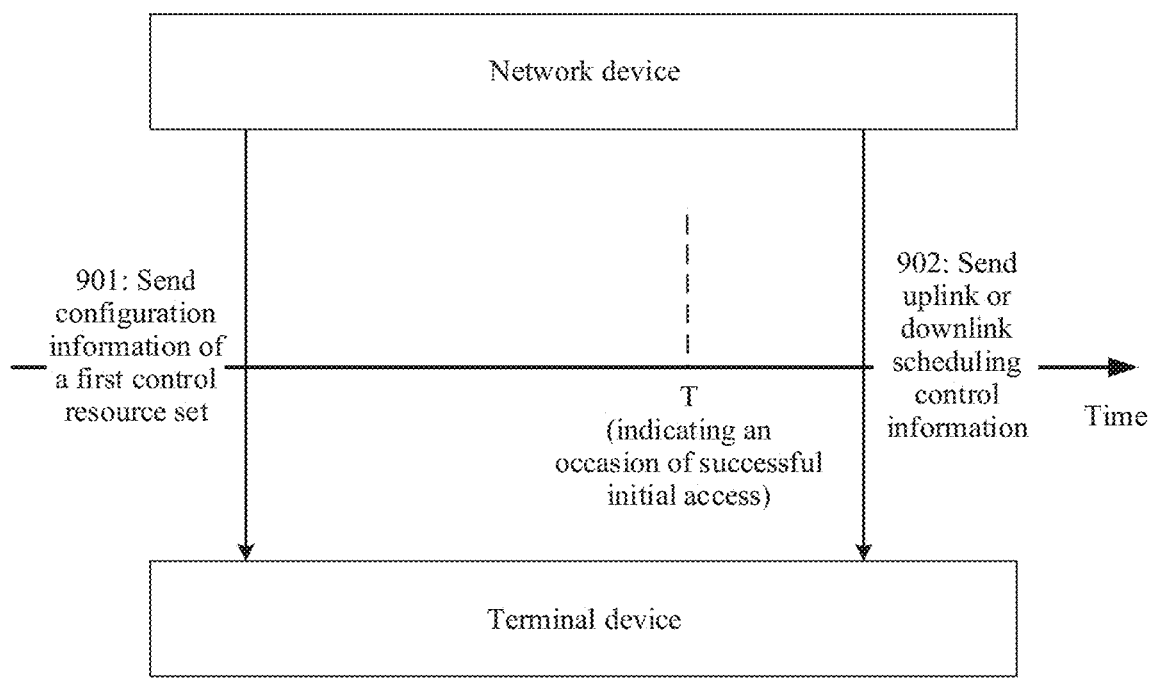
FIG. 9 is a schematic flowchart of a method for determining a frequency domain location of a control resource set according to an embodiment of this application.

Based on the communication system shown in FIG. 1, FIG. 9 is a schematic flowchart of another method for determining a frequency domain location of a control resource set according to an embodiment of this application. The method shown in FIG. 9 includes step 901 and step 902.

901: The network device sends configuration information of a first control resource set to the terminal device before successful initial access of the terminal device.

Correspondingly, the terminal device receives the configuration information of the first control resource set before the successful initial access of the terminal device.

902: The network device sends, based on a first common resource block set occupied by the first control resource set, the uplink or downlink scheduling control information on the physical downlink control channel after the successful initial access of the terminal device.

Correspondingly, the terminal device monitors, based on the first common resource block set occupied by the first control resource set, the physical downlink control channel after the successful initial access of the terminal device, to obtain the uplink or downlink scheduling control information.

The configuration information is used to indicate where a physical resource block (PRB) occupied by the first control resource set is located in a first downlink bandwidth part. An identifier of the first control resource set in this application is not 0.

Before the successful initial access of the terminal device, the terminal device does not monitor the physical downlink control channel based on a common resource block set occupied by the first control resource set. In addition, a frequency domain location of the first control resource set is determined by using a downlink bandwidth part as a reference. For details, refer to specific descriptions in FIG. 10 and FIG. 11.

Optionally, the configuration information of the first control resource set may be obtained from a SIB1, and the configuration information may take effect after the successful initial access of the terminal device. Taking effect herein means that the terminal device may monitor the physical downlink control channel based on the frequency domain location of the first control resource set, to obtain the uplink or downlink scheduling control information, or the network device may send the uplink or downlink scheduling control information on the physical downlink control channel based on the frequency domain location of the first control resource set.

Optionally, in a scenario in which the first downlink bandwidth part is an initial DL BWP configured in the SIB1, configuration information of the first downlink bandwidth part may also be obtained from the SIB1, but the configuration information of the first downlink bandwidth part configured in the SIB1 takes effect after the successful initial access of the terminal device. Taking effect herein means that downlink control information may be received based on a frequency domain location of the first downlink bandwidth part configured in the SIB1, or the network device may send downlink control information based on a frequency domain location of the first downlink bandwidth part configured in the SIB1. The terminal device may determine the frequency domain location of the first downlink bandwidth part by using one piece of higher layer signaling locationAndBandwidth and/or another parameter of the first downlink bandwidth part.

The first common resource block set occupied by the first control resource set includes a first start common resource block and another common resource block occupied by the first control resource set. In this embodiment of this application, both the network device and the terminal device may determine the first start common resource block, and may determine, based on the configuration information and a start common resource block of the referenced downlink bandwidth part, the common resource blocks that are occupied by the first control resource set and that start from the first start common resource block. How to determine the first start common resource block may be described in the following two cases (a B1$^{th}$ case and a B2$^{th}$ case).

Figure 10:
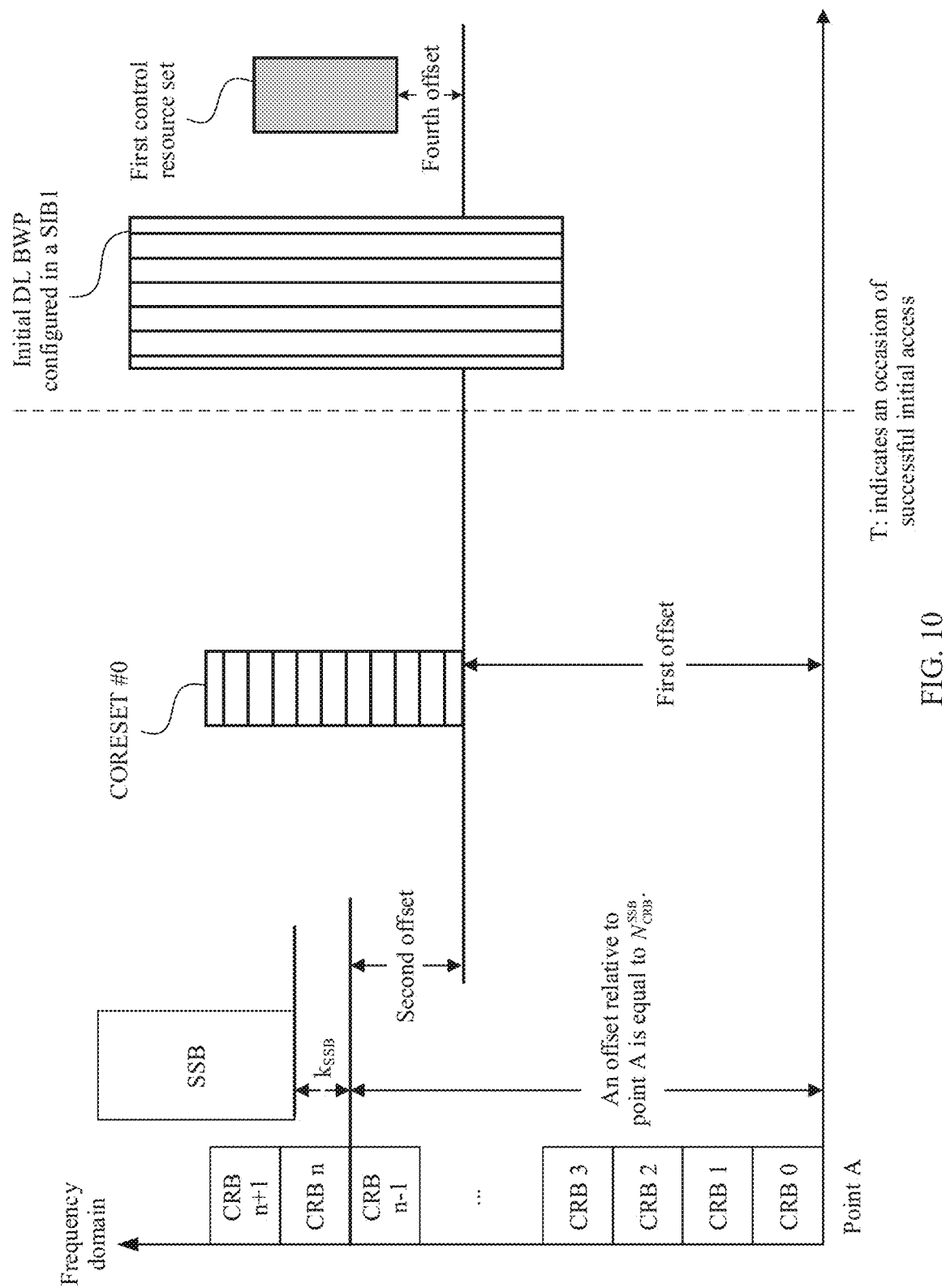
FIG. 10 is an example diagram of a frequency domain location of a control resource set according to an embodiment of this application.

In the B1$^{th}$ case, FIG. 10 is another example diagram of a frequency domain location of a control resource set according to an embodiment of this application. In FIG. 10, a first downlink bandwidth part is an initial DL BWP defined by using a CORESET #0, and a first start common resource block of a first control resource set is determined based on a second start common resource block of the CORESET #0 and configuration information of the first control resource set. Specifically, for a detailed process of determining the first start common resource block after the second start common resource block of the CORESET #0 is determined, refer to detailed descriptions in FIG. 6. A fourth offset refers to a quantity of common resource blocks between the second start common resource block of the CORESET #0 and the first start common resource block of the first control resource set.

The second start common resource block of the CORESET #0 is a lowest CRB occupied by the CORESET #0. The first start common resource block of the first control resource set is a lowest CRB occupied by the first control resource set. The second start common resource block of the CORESET #0 is determined based on a second start physical resource block of the CORESET #0 and a first offset. The first offset is used to indicate a quantity of physical resource blocks between the second start physical resource block and a reference point. The reference point is a common reference point for resource block grids. The reference point is used to indicate a center of a subcarrier 0 of a common resource block CRB 0 configured at a preset subcarrier spacing. As shown in FIG. 10, the common reference point may be a location of a point A, and indicates the center of the subcarrier 0 of the common resource block CRB 0.

The first offset is determined based on a second offset between the second start physical resource block of the first downlink bandwidth part and a third start physical resource block of an SS/PBCH block and a common resource block offset of the SS/PBCH block. The second offset is used to indicate a quantity of physical resource blocks between the second start physical resource block and the third start physical resource block of the SS/PBCH block. The common resource block offset of the SS/PBCH block is used to indicate a quantity of physical resource blocks between the third start physical resource block and the reference point. As shown in FIG. 10, an offset relative to point A (offsetToPointA) is equal to $N_{CRB}^{SSB}$. In this way, the first offset is equal to a value obtained by subtracting the second offset from $N_{CRB}^{SSB}$. The third start physical resource block is an RB that has a smallest RB index value and that is in CRBs overlapping the first RB of the SS/PBCH block.

Herein, only a manner of determining the second start common resource block of the CORESET #0 is briefly described. For further details, refer to detailed descriptions in FIG. 8.

Based on the B1$^{th}$ case, optionally, during actual application, there may be only one manner of configuring the first downlink bandwidth part. In this case, the first downlink bandwidth part is defined by using the CORESET #0. Alternatively, optionally, during actual application, the first downlink bandwidth part may be configured/defined by using the CORESET #0 and a SIB1. In this case, the first downlink bandwidth part defined by using the CORESET #0 is selected to determine a frequency domain location of the first control resource set.

Before successful initial access of a terminal device, the terminal device may obtain the configuration information of the first control resource set from a SIB1 message. Before the successful initial access of the terminal device, a network device may use the SIB1 message to carry the configuration information of the first control resource set. The terminal device and the network device may determine a first start common resource location of the first control resource set based on the second start common resource block of the CORESET #0. After the successful initial access of the terminal device, the terminal device monitors a physical downlink control channel based on the first control resource set shown in FIG. 10, to obtain uplink or downlink scheduling control information, and the network device sends the uplink or downlink scheduling control information on the physical downlink control channel based on the first control resource set shown in FIG. 10. Frequency domain locations of the first control resource set that are determined in this manner are the same, and the terminal device and the network device need to calculate the location of the first control resource set only once, thereby reducing complexity of determining the frequency domain location of the first control resource set.

An occasion of determining the frequency domain location of the first control resource set is not limited in this embodiment of this application. The frequency domain location of the first control resource set may be determined before the successful initial access of the terminal device and based on the configuration information and a frequency domain location of the first downlink bandwidth part defined by using the CORESET #0. Alternatively, the frequency domain location of the first control resource set may be determined after the successful initial access of the terminal device and based on the configuration information and a frequency domain location of the first downlink bandwidth part defined by using the CORESET #0.

Figure 11:
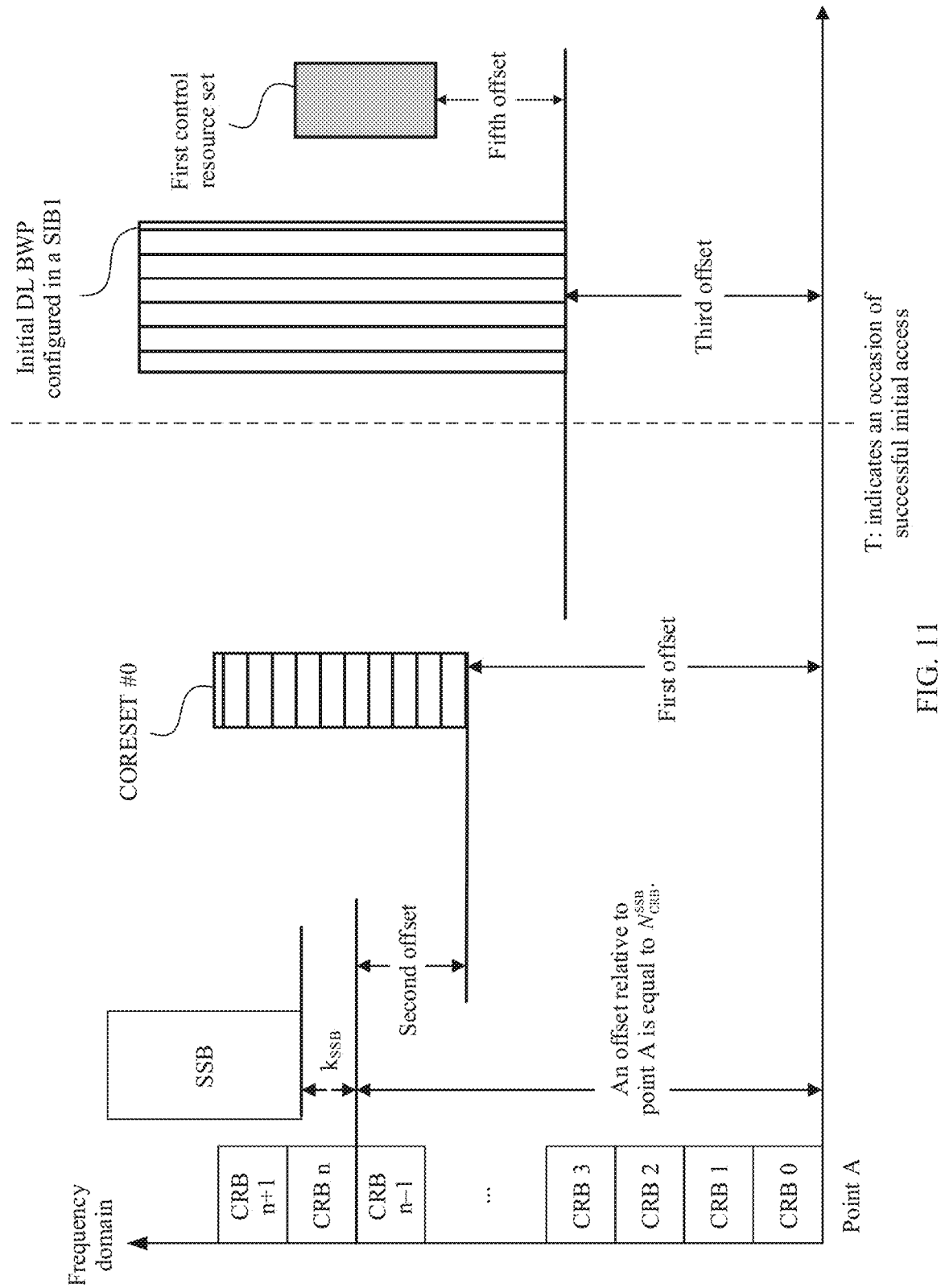
FIG. 11 is an example diagram of a frequency domain location of a control resource set according to an embodiment of this application.

In the B2$^{th}$ case, FIG. 11 is another example diagram of a frequency domain location of a control resource set according to an embodiment of this application. In FIG. 11, a first downlink bandwidth part is an initial DL BWP configured in a SIB1, and a first start common resource block of a first control resource set is determined based on a second start common resource block of the first downlink bandwidth part configured in the SIB1 and configuration information of the first control resource set. Specifically, for a detailed process of determining the first start common resource block of the first control resource set after the second start common resource block of the first downlink bandwidth part configured in the SIB1 is determined, refer to detailed descriptions in FIG. 6. A fifth offset refers to a quantity of common resource blocks between the second start common resource block of the first downlink bandwidth part configured in the SIB1 and the first start common resource block of the first control resource set.

In a case that the first downlink bandwidth part is configured based on the SIB1, the second start common resource block of the first downlink bandwidth part is determined based on a second start physical resource block of the first downlink bandwidth part and a third offset. The third offset is used to indicate a quantity of physical resource blocks between the second start physical resource block and a reference point. The reference point is a common reference point for resource block grids. The reference point is used to indicate a center of a subcarrier 0 of a common resource block CRB 0 configured at a preset subcarrier spacing. As shown in FIG. 11, the common reference point may be a location of a point A, and indicates the center of the subcarrier 0 of the common resource block CRB 0. Herein, only a manner of determining the second start common resource block of the first downlink bandwidth part configured in the SIB1 is briefly described. For details, refer to detailed descriptions in FIG. 8.

Based on the B2$^{th}$ case, optionally, during actual application, there may be only one manner of configuring the first downlink bandwidth part. In this case, the first downlink bandwidth part is configured by using the SIB1. Alternatively, optionally, during actual application, the first downlink bandwidth part may be configured by using a CORESET #0 and the SIB1. In this case, the first downlink bandwidth part configured in the SIB1 is selected to determine a frequency domain location of the first control resource set.

Before successful initial access of a terminal device, the terminal device may obtain the configuration information of the first control resource set from a SIB1 message. Before the successful initial access of the terminal device, a network device may use the SIB1 message to carry the configuration information of the first control resource set. The terminal device and the network device may determine a first start common resource location of the first control resource set based on the second start common resource block of the first downlink bandwidth part configured in the SIB1. After the successful initial access of the terminal device, the terminal device monitors a physical downlink control channel based on the first control resource set shown in FIG. 11, to obtain uplink or downlink scheduling control information, and the network device sends the uplink or downlink scheduling control information on the physical downlink control channel based on the first control resource set shown in FIG. 11. Frequency domain locations of the first control resource set that are determined in this manner are the same, and the terminal device and the network device need to calculate the location of the first control resource set only once, thereby reducing complexity of determining the frequency domain location of the first control resource set.

An occasion of determining the frequency domain location of the first control resource set is not limited in this embodiment of this application. The frequency domain location of the first control resource set may be determined before the successful initial access of the terminal device and based on the configuration information and a frequency domain location of the first downlink bandwidth part configured in the SIB1. Alternatively, the frequency domain location of the first control resource set may be determined after the successful initial access of the terminal device and based on the configuration information and a frequency domain location of the first downlink bandwidth part configured in the SIB1.

An occasion T in FIG. 9, FIG. 10, and FIG. 11 indicates an occasion of the successful initial access of the terminal device. The network device and the terminal device may define the occasion T differently. In an optional implementation, the terminal device determines that the occasion of the successful initial access is used to indicate one of the following occasions (10-1), (10-2), (10-3), (10-4), (10-5), or (10-6), where (10-1): an occasion on which the terminal device successfully receives an initially transmitted message 4 and sends an acknowledgement message to the network device;

(10-2): an occasion on which the terminal device successfully receives, after the terminal device successfully receives an initially transmitted message 4, DCI scrambled by using a C-RNTI;

(10-3): an occasion on which the terminal device successfully receives a retransmitted message 4 and sends an acknowledgement message to the network device;

(10-4): an occasion on which the terminal device successfully receives, after the terminal device successfully receives a retransmitted message 4, DCI scrambled by using a C-RNTI;

(10-5): an occasion on which the terminal device successfully receives, after successfully receiving an initially transmitted message 4, configuration information used to indicate that DCI scrambled by using a C-RNTI needs to be blindly detected; or (10-6): an occasion on which the terminal device successfully receives, after successfully receiving a retransmitted message 4, configuration information used to indicate that DCI scrambled by using a C-RNTI needs to be blindly detected.

The network device determines that the occasion of the successful initial access is used to indicate one of the following occasions (10-7), (10-8), (10-9), or (10-10), where (10-7): an occasion on which the network device receives an acknowledgement message that is sent by the terminal device and that is for an initially transmitted message 4 sent by the network device;

(10-8): an occasion on which the network device receives an acknowledgement message that is sent by the terminal device and that is for a retransmitted message 4 sent by the network device;

(10-9): an occasion on which the network device sends, to the terminal device after receiving an acknowledgement message that is sent by the terminal device and that is for an initially transmitted message 4 sent by the network device, configuration information used to indicate that DCI scrambled by using a C-RNTI needs to be blindly detected; or (10-10): an occasion on which the network device sends, to the terminal device after receiving an acknowledgement message that is sent by the terminal device and that is for a retransmitted message 4 sent by the network device, configuration information used to indicate that DCI scrambled by using a C-RNTI needs to be blindly detected.

In this embodiment of this application, before the successful initial access of the terminal device, the network device does not send the uplink or downlink scheduling control information on the physical downlink control channel based on the common resource block set occupied by the first control resource set, and the terminal device does not monitor the physical downlink control channel based on the frequency domain location of the first control resource set. In this way, neither the network device nor the terminal device needs to determine the frequency domain location of the first control resource set before the successful initial access of the terminal device, and the frequency domain location that is of the first control resource set and that is after the initial access of the terminal device is determined by using the referenced downlink bandwidth part. In this way, the terminal device and the network device need to calculate the frequency domain location of the first control resource set only once, thereby reducing complexity of determining the frequency domain location of the first control resource set.

Figure 12:
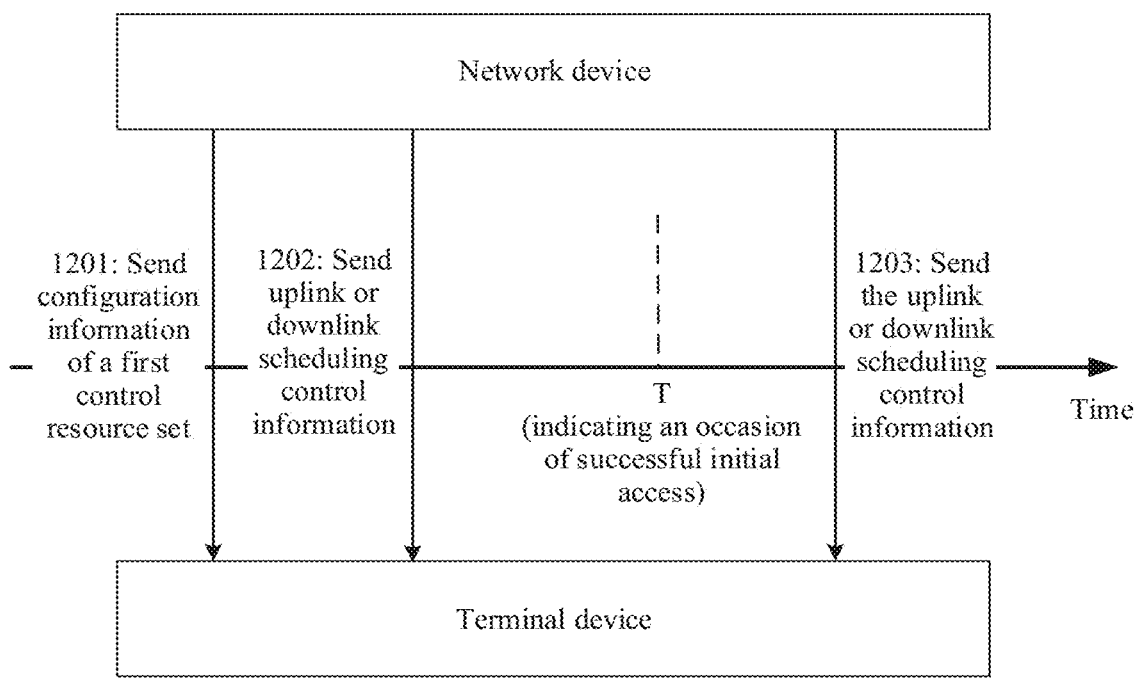
FIG. 12 is a schematic flowchart of a method for determining a frequency domain location of a control resource set according to an embodiment of this application.

Based on the communication system shown in FIG. 1, FIG. 12 is a schematic flowchart of another method for determining a frequency domain location of a control resource set according to an embodiment of this application. The method shown in FIG. 12 includes step 1201 to step 1203.

1201: The network device sends configuration information of a first control resource set to the terminal device before successful initial access of the terminal device. Correspondingly, the terminal device receives the configuration information of the first control resource set before the successful initial access of the terminal device.

1202: The network device sends, based on a first common resource block set occupied by the first control resource set, the uplink or downlink scheduling control information on the physical downlink control channel before the successful initial access of the terminal device.

Correspondingly, the terminal device monitors, based on the first common resource block set occupied by the first control resource set, the physical downlink control channel before the successful initial access of the terminal device, to obtain the uplink or downlink scheduling control information.

1203: The network device sends, based on a third common resource block set occupied by the first control resource set, the uplink or downlink scheduling control information on the physical downlink control channel after the successful initial access of the terminal device.

Correspondingly, the terminal device monitors, based on the third common resource block set occupied by the first control resource set, the physical downlink control channel after the successful initial access of the terminal device, to obtain the uplink or downlink scheduling control information.

In step 1202, a first start common resource block included in the first common resource block set is determined based on a second start common resource block of a first downlink bandwidth part and the configuration information of the first control resource set, and the configuration information is used to indicate where a physical resource block occupied by the first common control resource set is located in the first downlink bandwidth part. The first downlink bandwidth part herein may be defined by using a CORESET #0.

In step 1203, a third start common resource block included in the third common resource block set is determined based on a fourth start common resource block of a second downlink bandwidth part and the configuration information of the first control resource set, and the configuration information is used to indicate where a physical resource block occupied by the first control resource set is located in the second downlink bandwidth part. The second downlink bandwidth part herein may be configured in a SIB1.

Figure 13:
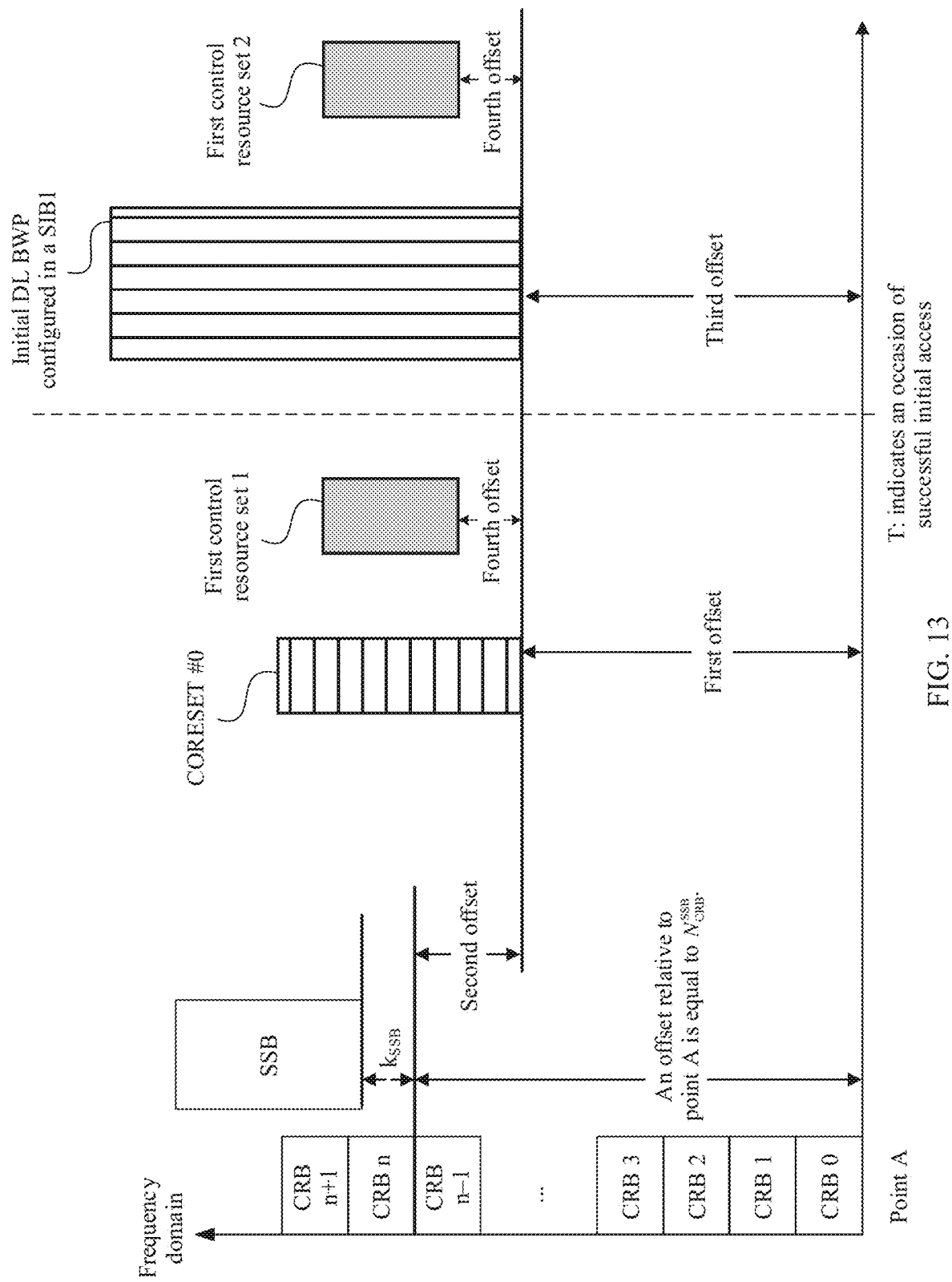
FIG. 13 is an example diagram of frequency domain locations of control resource sets according to an embodiment of this application.

In the embodiment shown in FIG. 13, the second start common resource block of the first downlink bandwidth part is the same as the fourth start common resource block of the second downlink bandwidth part. In this way, although downlink bandwidth parts referenced by the first control resource set before and after the successful initial access of the terminal device are different, the first start common resource block that is of the first control resource set and that is determined based on the first downlink bandwidth part can still be the same, by setting the start common resource blocks of the two downlink bandwidth parts to be the same, as the third start common resource block that is of the first control resource set and that is determined based on the second downlink bandwidth part.

An identifier of the first control resource set in this application is not 0.

Optionally, the configuration information of the first control resource set may be obtained from a SIB1, and the configuration information may take effect before or after the successful initial access of the terminal device. Taking effect herein means that the terminal device may monitor the physical downlink control channel based on a frequency domain location of the first control resource set, to obtain the uplink or downlink scheduling control information, or the network device may send the uplink or downlink scheduling control information on the physical downlink control channel based on a frequency domain location of the first control resource set.

Optionally, in a scenario in which the first downlink bandwidth part is an initial DL BWP configured in the SIB1, configuration information of the first downlink bandwidth part may also be obtained from the SIB1, but the configuration information of the first downlink bandwidth part configured in the SIB1 takes effect after the successful initial access of the terminal device. Taking effect herein means that the terminal device may determine a frequency domain location of the first downlink bandwidth part by using one piece of higher layer signaling locationAndBandwidth and/or another parameter of the first downlink bandwidth part, and may receive downlink control information based on the frequency domain location of the first downlink bandwidth part configured in the SIB1, or the network device may send downlink control information based on the frequency domain location of the first downlink bandwidth part configured in the SIB1.

Before the successful initial access of the terminal device, first common resource blocks occupied by the first control resource set include the first start common resource block and another common resource block occupied by the first control resource set. After the successful initial access of the terminal device, third common resource blocks occupied by the first control resource set include the third start common resource block and another common resource block occupied by the first control resource set. In this embodiment of this application, both the network device and the terminal device may determine the first start common resource block and the third start common resource block, may determine, based on the configuration information and the start common resource block of the referenced downlink bandwidth part, the common resource blocks that are occupied by the first control resource set and that start from the first start common resource block, and may determine, based on the configuration information and the start common resource block of the referenced downlink bandwidth part, the common resource blocks that are occupied by the first control resource set and that start from the third start common resource block. For how to determine the first start common resource block and the third start common resource block, refer to detailed descriptions in FIG. 13.

FIG. 13 is another example diagram of frequency domain locations of control resource sets according to an embodiment of this application. In FIG. 13, a first downlink bandwidth part is an initial DL BWP defined by using a CORESET #0, and a first start common resource block of a first control resource set 1 is determined based on a second start common resource block of the CORESET #0 and configuration information of the first control resource set. A second downlink bandwidth part is an initial DL BWP configured in a SIB1, and a third start common resource block of a first control resource set 2 is determined based on a fourth start common resource block of the initial DL BWP configured in the SIB1 and the configuration information of the first control resource set. The second start common resource block of the first downlink bandwidth part is the same as the fourth start common resource block of the second downlink bandwidth part.

Specifically, start common resource block of the CORESET #0 for a detailed process of determining the first start common resource block of the first control resource set 1 after the second start common resource block of the CORESET #0 is determined, refer to detailed descriptions in FIG. 6. For a detailed process of determining the third start common resource block of the first control resource set 2 after the fourth start common resource block of the initial DL BWP configured in the SIB1 is determined, refer to detailed descriptions in FIG. 6. A fourth offset refers to a quantity of common resource blocks between the second start common resource block of the CORESET #0 and the first start common resource block of the first control resource set.

The second start common resource block of the CORESET #0 is a lowest CRB occupied by the CORESET #0. The first start common resource block of the first control resource set is a lowest CRB occupied by the first control resource set. The second start common resource block of the CORESET #0 is determined based on a second start physical resource block of the CORESET #0 and a first offset. The first offset is used to indicate a quantity of physical resource blocks between the second start physical resource block and a reference point. The reference point is a common reference point for resource block grids. The reference point is used to indicate a center of a subcarrier 0 of a common resource block CRB 0 configured at a preset subcarrier spacing. As shown in FIG. 4, the common reference point may be a location of a point A, and indicates the center of the subcarrier 0 of the common resource block CRB 0.

The first offset is determined based on a second offset between the second start physical resource block of the CORESET #0 and a third start physical resource block of an SS/PBCH block and a common resource block offset of the SS/PBCH block. The second offset is used to indicate a quantity of physical resource blocks between the second start physical resource block and the third start physical resource block of the SS/PBCH block. The common resource block offset of the SS/PBCH block is used to indicate a quantity of physical resource blocks between the third start physical resource block and the reference point. As shown in FIG. 10, an offset relative to point A (offsetToPointA) is equal to $N_{CRB}^{SSB}$. In this way, the first offset is equal to a value obtained by subtracting the second offset from $N_{CRB}^{SSB}$.

Herein, only a manner of determining the second start common resource block of the CORESET #0 is briefly described. For further details, refer to detailed descriptions in FIG. 8.

When the second downlink bandwidth part is configured based on the SIB1, the fourth start common resource block of the second downlink bandwidth part (the initial DL BWP configured in the SIB1 in FIG. 13) is determined based on a fourth start physical resource block of the second downlink bandwidth part and a third offset. The third offset is used to indicate a quantity of physical resource blocks between the fourth start physical resource block and the reference point. The reference point is a location of a point A in FIG. 13. Herein, only a manner of determining the fourth start common resource block of the second downlink bandwidth part configured in the SIB1 is briefly described. For details, refer to detailed descriptions in FIG. 8.

Before successful initial access of a terminal device, the terminal device may obtain the configuration information of the first control resource set from a SIB1 message. Before the successful initial access of the terminal device, a network device may use the SIB1 message to carry the configuration information of the first control resource set. The terminal device and the network device may determine a first start common resource location of the first control resource set 1 based on the second start common resource block of the CORESET #0, and may determine a third start common resource location of the first control resource set 2 based on the fourth start common resource block of the initial DL BWP configured in the SIB1.

Before the successful initial access of the terminal device, the terminal device monitors a physical downlink control channel based on the first control resource set 1 shown in FIG. 13, to obtain uplink or downlink scheduling control information, and the network device sends the uplink or downlink scheduling control information on the physical downlink control channel based on the first control resource set 1 shown in FIG. 13. After the successful initial access of the terminal device, the terminal device monitors the physical downlink control channel based on the first control resource set 2 shown in FIG. 13, to obtain the uplink or downlink scheduling control information, and the network device sends the uplink or downlink scheduling control information on the physical downlink control channel based on the first control resource set 2 shown in FIG. 13. Frequency domain locations of the first control resource set that are determined in this manner are the same, and the terminal device and the network device need to calculate the location of the first control resource set only once, thereby reducing complexity of determining the frequency domain location of the first control resource set.

An occasion of determining the frequency domain location of the first control resource set is not limited in this embodiment of this application. For example, the frequency domain location of the first control resource set only needs to be determined before monitoring/sending performed on the first control resource set 1 or the first control resource set 2. This is not limited in this embodiment of this application.

An occasion Tin FIG. 12 and FIG. 13 indicates an occasion of the successful initial access of the terminal device. The network device and the terminal device may define the occasion T differently. In an optional implementation, the terminal device determines that the occasion of the successful initial access is used to indicate one of the following occasions (13-1), (13-2), (13-3), (13-4), (13-5), (13-6), (13-7), (13-8), (13-9), or (13-10), where (13-1): an occasion on which the terminal device successfully receives an initially transmitted message 4 and sends an acknowledgement message to the network device;

(13-2): an occasion on which the terminal device successfully receives, after the terminal device successfully receives an initially transmitted message 4, DCI scrambled by using a C-RNTI;

(13-3): an occasion on which the terminal device successfully receives a retransmitted message 4 and sends an acknowledgement message to the network device;

(13-4): an occasion on which the terminal device successfully receives, after the terminal device successfully receives a retransmitted message 4, DCI scrambled by using a C-RNTI;

(13-5): when common resource blocks occupied by the first downlink bandwidth part and the second downlink bandwidth part are different, a switching completion occasion on which the terminal device switches from the first downlink bandwidth part to the second downlink bandwidth part after successfully receiving an initially transmitted message 4 and sending an acknowledgement message to the network device;

(13-6): when common resource blocks occupied by the first downlink bandwidth part and the second downlink bandwidth part are different, a switching completion occasion on which the terminal device switches from the first downlink bandwidth part to the second downlink bandwidth part after successfully receiving a retransmitted message 4 and sending an acknowledgement message to the network device;

(13-7): when common resource blocks occupied by the first downlink bandwidth part and the second downlink bandwidth part are different, an occasion on which the terminal device successfully receives, after the terminal device successfully receives an initially transmitted message 4 and switches from the first downlink bandwidth part to the second downlink bandwidth part, DCI scrambled by using a C-RNTI;

(13-8): when common resource blocks occupied by the first downlink bandwidth part and the second downlink bandwidth part are different, an occasion on which the terminal device successfully receives, after the terminal device successfully receives a retransmitted message 4 and switches from the first downlink bandwidth part to the second downlink bandwidth part, DCI scrambled by using a C-RNTI;

(13-9): when common resource blocks occupied by the first downlink bandwidth part and the second downlink bandwidth part are different, an occasion on which the terminal device successfully receives, after the terminal device successfully receives an initially transmitted message 4 and switches from the first downlink bandwidth part to the second downlink bandwidth part, configuration information used to indicate that DCI scrambled by using a C-RNTI needs to be blindly detected; or (13-10): when common resource blocks occupied by the first downlink bandwidth part and the second downlink bandwidth part are different, an occasion on which the terminal device successfully receives, after the terminal device successfully receives a retransmitted message 4 and switches from the first downlink bandwidth part to the second downlink bandwidth part, configuration information used to indicate that DCI scrambled by using a C-RNTI needs to be blindly detected.

The network device determines that the occasion of the successful initial access is used to indicate one of the following occasions (13-11), (13-12), (13-13), or (13-14), where (13-11): an occasion on which the network device receives an acknowledgement message that is sent by the terminal device and that is for an initially transmitted message 4 sent by the network device;

(13-12): an occasion on which the network device receives an acknowledgement message that is sent by the terminal device and that is for a retransmitted message 4 sent by the network device;

(13-13): an occasion on which the network device sends, to the terminal device after receiving an acknowledgement message that is sent by the terminal device and that is for an initially transmitted message 4 sent by the network device, configuration information used to indicate that DCI scrambled by using a C-RNTI needs to be blindly detected; or (13-14): an occasion on which the network device sends, to the terminal device after receiving an acknowledgement message that is sent by the terminal device and that is for a retransmitted message 4 sent by the network device, configuration information used to indicate that DCI scrambled by using a C-RNTI needs to be blindly detected;

(13-15): when common resource blocks occupied by the first downlink bandwidth part and the second downlink bandwidth part are different, a switching completion occasion on which the network device switches from the first downlink bandwidth part to the second downlink bandwidth part after receiving an acknowledgement message that is sent by the terminal device and that is for an initially transmitted message 4 sent by the network device;

(13-16): when common resource blocks occupied by the first downlink bandwidth part and the second downlink bandwidth part are different, a switching completion occasion on which the network device switches from the first downlink bandwidth part to the second downlink bandwidth part after receiving an acknowledgement message that is sent by the terminal device and that is for a retransmitted message 4 sent by the network device;

(13-17): when common resource blocks occupied by the first downlink bandwidth part and the second downlink bandwidth part are different, an occasion on which the network device sends, to the terminal device after receiving an acknowledgement message that is sent by the terminal device and that is for an initially transmitted message 4 sent by the network device and switching from the first downlink bandwidth part to the second downlink bandwidth part, configuration information used to indicate that DCI scrambled by using a C-RNTI needs to be blindly detected; or (13-18): when common resource blocks occupied by the first downlink bandwidth part and the second downlink bandwidth part are different, an occasion on which the network device sends, to the terminal device after receiving an acknowledgement message that is sent by the terminal device and that is for a retransmitted message 4 sent by the network device and switching from the first downlink bandwidth part to the second downlink bandwidth part, configuration information used to indicate that DCI scrambled by using a C-RNTI needs to be blindly detected.

In this embodiment of this application, before and after the successful initial access of the terminal device, frequency domain locations of the first control resource set may be determined based on frequency domain locations of different downlink bandwidth parts. However, because it is specified that locations of start common resource blocks of the different downlink bandwidth parts are the same, the frequency domain locations of the first control resource set that use the different downlink bandwidth parts as references may still be the same. In this way, the terminal device and the network device need to calculate the frequency domain location of the first control resource set only once, thereby reducing complexity of determining the frequency domain location of the first control resource set.

Figure 14:
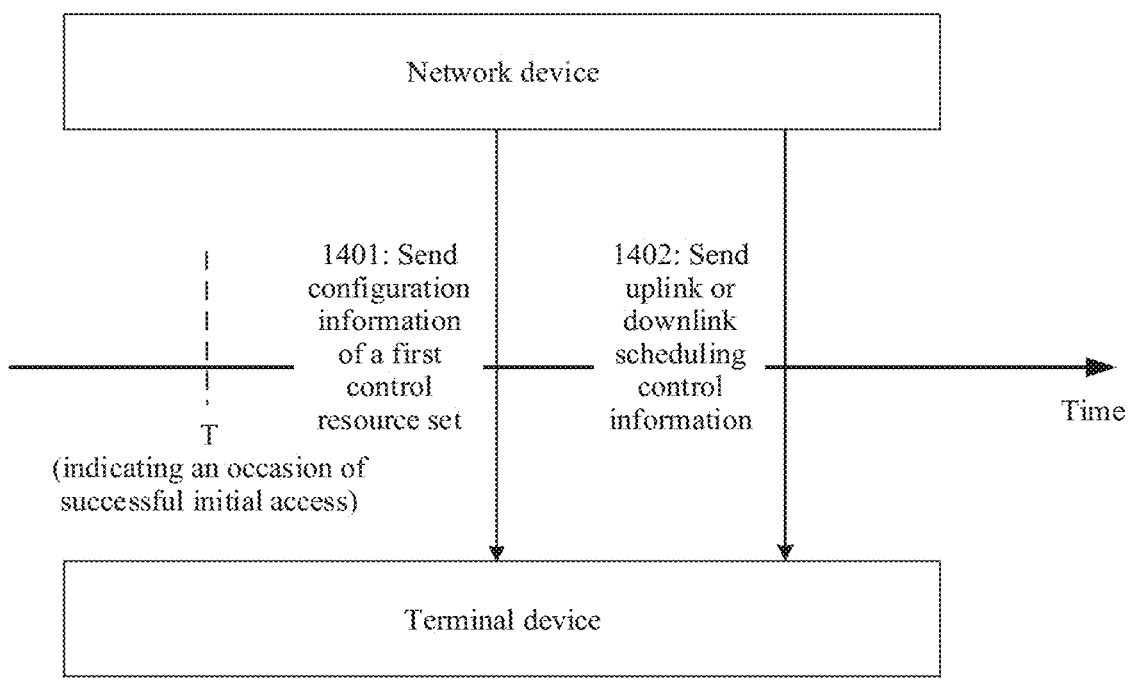
FIG. 14 is a schematic flowchart of a method for determining a frequency domain location of a control resource set according to an embodiment of this application.

Based on the communication system shown in FIG. 1, FIG. 14 is a schematic flowchart of another method for determining a frequency domain location of a control resource set according to an embodiment of this application. The method shown in FIG. 14 includes step 1401 and step 1402.

1401: The network device sends configuration information of a first control resource set to the terminal device after successful initial access of the terminal device.

Correspondingly, the terminal device receives the configuration information of the first control resource set after the successful initial access of the terminal device.

1402: The network device sends, based on a first common resource block set occupied by the first control resource set, the uplink or downlink scheduling control information on the physical downlink control channel after the successful initial access of the terminal device.

Correspondingly, the terminal device monitors, based on the first common resource block set occupied by the first control resource set, the physical downlink control channel after the successful initial access of the terminal device, to obtain the uplink or downlink scheduling control information.

The configuration information is used to indicate where a physical resource block (PRB) occupied by the first control resource set is located in a first downlink bandwidth part. An identifier of the first control resource set in this application is not 0.

The configuration information of the first control resource set is not configured before the successful initial access of the terminal device. The configuration information of the first control resource set is configured only after the successful initial access of the terminal device. After the successful initial access of the terminal device, the terminal device may monitor the physical downlink control channel based on the common resource block set occupied by the first control resource set. In addition, a frequency domain location of the first control resource set is determined by using a downlink bandwidth part as a reference. For details, refer to specific descriptions in FIG. 15.

Optionally, the configuration information of the first control resource set may be obtained from a SIB1 after the successful initial access of the terminal device, and the configuration information may take effect after the successful initial access of the terminal device. Taking effect herein means that the terminal device may monitor the physical downlink control channel based on the frequency domain location of the first control resource set, to obtain the uplink or downlink scheduling control information, or the network device may send the uplink or downlink scheduling control information on the physical downlink control channel based on the frequency domain location of the first control resource set.

Alternatively, optionally, the configuration information of the first control resource set may be configured, after the successful initial access of the terminal device, from another message for configuring the downlink bandwidth part. This is not limited in the embodiment shown in FIG. 14.

Further, optionally, in the embodiment shown in FIG. 14, the configuration information of the first control resource set and configuration information of the first downlink bandwidth part are received simultaneously. The configuration information of the first control resource set is included in the configuration information of the first downlink bandwidth part. The frequency domain location of the first control resource set is determined by using, as a reference, the configuration information that is of the first downlink bandwidth part and that includes the configuration information of the first control resource set. In other words, after the successful initial access of the terminal device, both the configuration information of the first control resource set and the configuration information of the first downlink bandwidth part may be obtained from one configuration message. The frequency domain location of the first control resource set is determined based on the configuration information of the first downlink bandwidth part and the configuration information of the first control resource set.

First common resource blocks occupied by the first control resource set include a first start common resource block and another common resource block occupied by the first control resource set. In this embodiment of this application, both the network device and the terminal device may determine the first start common resource block, and may determine, based on the configuration information and a start common resource block of the referenced downlink bandwidth part, the common resource blocks that are occupied by the first control resource set and that start from the first start common resource block. For how to determine the first start common resource block, refer to specific descriptions in FIG. 15.

Figure 15:
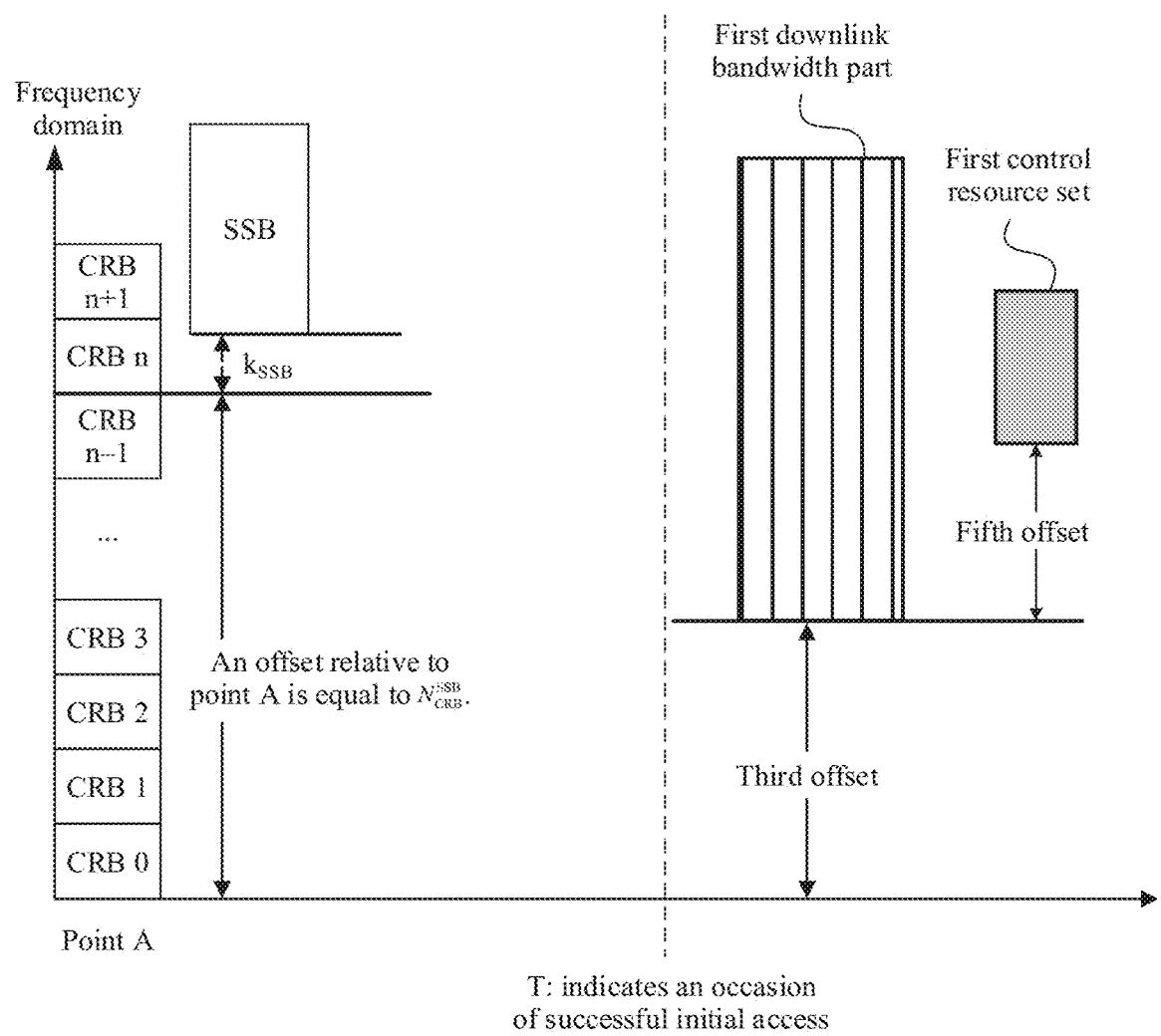
FIG. 15 is an example diagram of a frequency domain location of a control resource set according to an embodiment of this application.

FIG. 15 is another example diagram of a frequency domain location of a control resource set according to an embodiment of this application. In FIG. 15, a first downlink bandwidth part is configured in a SIB1 or by using another configuration message, and a first start common resource block of a first control resource set is determined based on a second start common resource block of the first downlink bandwidth part and configuration information of the first control resource set. Specifically, the second start common resource block of the first downlink bandwidth part for a detailed process of determining the first start common resource block after the second start common resource block of the first downlink bandwidth part is determined, refer to detailed descriptions in FIG. 6. A fifth offset refers to a quantity of common resource blocks between the second start common resource block of the first downlink bandwidth part configured in the SIB1 or by using the another configuration message and the first start common resource block of the first control resource set.

The second start common resource block of the first downlink bandwidth part is determined based on a second start physical resource block of the first downlink bandwidth part and a third offset. The third offset is used to indicate a quantity of physical resource blocks between the second start physical resource block and a reference point. The reference point is a common reference point for resource block grids. The reference point is used to indicate a center of a subcarrier 0 of a common resource block CRB 0 configured at a preset subcarrier spacing. As shown in FIG. 15, the common reference point may be a location of a point A, and indicates the center of the subcarrier 0 of the common resource block CRB 0. Herein, only a manner of determining the second start common resource block of the first downlink bandwidth part is briefly described. For details, refer to detailed descriptions in FIG. 8.

Optionally, during actual application, there may be only one manner of configuring the first downlink bandwidth part. Alternatively, optionally, during actual application, the first downlink bandwidth part may be configured by using a CORESET #0 and another configuration message. In this case, the first downlink bandwidth part configured after successful initial access of a terminal device is selected to determine a frequency domain location of the first control resource set.

After the successful initial access of the terminal device, the terminal device may obtain the configuration information of the first control resource set from a configuration message. After the successful initial access of the terminal device, a network device may use the configuration message to carry the configuration information of the first control resource set. The terminal device and the network device may determine a first start common resource location of the first control resource set based on the second start common resource block of the first downlink bandwidth part in the configuration message. After the successful initial access of the terminal device, the terminal device monitors a physical downlink control channel based on the first control resource set shown in FIG. 15, to obtain uplink or downlink scheduling control information, and the network device sends the uplink or downlink scheduling control information on the physical downlink control channel based on the first control resource set shown in FIG. 15. Frequency domain locations of the first control resource set that are determined in this manner are the same, and the terminal device and the network device need to calculate the location of the first control resource set only once, thereby reducing complexity of determining the frequency domain location of the first control resource set.

An occasion T in FIG. 14 and FIG. 15 indicates an occasion of the successful initial access of the terminal device. The network device and the terminal device may define the occasion T differently. In an optional implementation, the terminal device determines that the occasion of the successful initial access is used to indicate one of the following occasions (15-1), (15-2), (15-3), (15-4), (15-5), or (15-6), where (15-1): an occasion on which the terminal device successfully receives an initially transmitted message 4 and sends an acknowledgement message to the network device;

(15-2): an occasion on which the terminal device successfully receives, after the terminal device successfully receives an initially transmitted message 4, DCI scrambled by using a C-RNTI;

(15-3): an occasion on which the terminal device successfully receives a retransmitted message 4 and sends an acknowledgement message to the network device;

(15-4): an occasion on which the terminal device successfully receives, after the terminal device successfully receives a retransmitted message 4, DCI scrambled by using a C-RNTI;

(15-5): an occasion on which the terminal device successfully receives, after successfully receiving an initially transmitted message 4, configuration information used to indicate that DCI scrambled by using a C-RNTI needs to be blindly detected; or (15-6): an occasion on which the terminal device successfully receives, after successfully receiving a retransmitted message 4, configuration information used to indicate that DCI scrambled by using a C-RNTI needs to be blindly detected.

The network device determines that the occasion of the successful initial access is used to indicate one of the following occasions (15-7), (15-8), (15-9), or (15-10):

(15-7): an occasion on which the network device receives an acknowledgement message that is sent by the terminal device and that is for an initially transmitted message 4 sent by the network device;

(15-8): an occasion on which the network device receives an acknowledgement message that is sent by the terminal device and that is for a retransmitted message 4 sent by the network device;

(15-9): an occasion on which the network device sends, to the terminal device after receiving an acknowledgement message that is sent by the terminal device and that is for an initially transmitted message 4 sent by the network device, configuration information used to indicate that DCI scrambled by using a C-RNTI needs to be blindly detected; or (15-10): an occasion on which the network device sends, to the terminal device after receiving an acknowledgement message that is sent by the terminal device and that is for a retransmitted message 4 sent by the network device, configuration information used to indicate that DCI scrambled by using a C-RNTI needs to be blindly detected.

In this embodiment of this application, before the successful initial access of the terminal device, the network device does not send the uplink or downlink scheduling control information on the physical downlink control channel based on the common resource block set occupied by the first control resource set, and the terminal device does not monitor the physical downlink control channel based on the frequency domain location of the first control resource set. In this way, neither the network device nor the terminal device needs to determine the frequency domain location of the first control resource set before the successful initial access of the terminal device, and the frequency domain location that is of the first control resource set and that is after the initial access of the terminal device is determined by using the referenced downlink bandwidth part. In this way, the terminal device and the network device need to calculate the frequency domain location of the first control resource set only once, thereby reducing complexity of determining the frequency domain location of the first control resource set.

For the method embodiments shown in FIG. 3 to FIG. 15, it should be noted that during actual application, in a first possible implementation, an occasion on which the network device configures the first control resource set is not limited. In other words, the configuration message of the first control resource set may be configured before the successful initial access of the terminal device, or may be configured after the successful initial access of the terminal device. In this scenario, the various implementable solutions described in FIG. 3 to FIG. 15 may be included.

For example, because the occasion on which the network device configures the first control resource set is uncertain, the terminal device may monitor the channel before the initial access, to obtain the configuration information of the first control resource set. When the terminal device obtains the configuration information of the first control resource set or does not obtain the configuration information of the first control resource set, the terminal device may monitor the channel after the initial access, to obtain the configuration information of the first control resource set.

Based on the first possible implementation, further, an occasion of configuring the downlink bandwidth part referenced by the first control resource set may not be limited. In this scenario, if the network device configures a new downlink bandwidth part, when the terminal device receives configuration information of the new downlink bandwidth part, the location of the first control resource set may be determined with reference to a frequency domain location of the new downlink bandwidth part.

In a second possible implementation solution, an occasion on which the network device configures the first control resource set may be limited. For example, a limitation is that the configuration message of the first control resource set may be configured after the successful initial access of the terminal device. In this scenario, refer to the implementation solutions described in FIG. 14 and FIG. 15. For example, because the occasion on which the network device configures the first control resource set is after the successful initial access of the terminal device, the terminal device does not need to monitor the channel before the initial access, but the terminal device starts to monitor the channel after the successful initial access of the terminal device, to obtain the configuration information of the first control resource set. In this way, a power loss, of the terminal device, caused by uncertain monitoring can be reduced.

Based on the second possible implementation, further, an occasion of configuring the downlink bandwidth part referenced by the first control resource set may be limited. In this scenario, if a limitation is that the configuration occasion of the downlink bandwidth part is after the successful initial access of the terminal device, once the network device configures a new downlink bandwidth part, when the terminal device receives configuration information of the new downlink bandwidth part, the location of the first control resource set may be determined with reference to a frequency domain location of the new downlink bandwidth part.

In another possible implementation, regardless of whether the first control resource set is configured before the successful initial access of the terminal device or after the successful initial access of the terminal device, regardless of whether the initial DL BWP is configured in the SIB1, after the successful initial access of the terminal devices, the network device configures at least one of the first control resource set, a newly configured initial DL BWP, or another DL BWP (a non-initial DL BWP or a BWP whose BWP_ID is not 0) for the terminal device by using higher layer signaling (for example, RRC signaling).

If a configuration of the first control resource set is in the newly configured initial DL BWP, the frequency domain location of the first control resource set uses the CORESET #0 or the newly configured initial DL BWP as a reference. In other words, in the embodiments shown in FIG. 3 to FIG. 15, after the successful initial access of the terminal device, the network device configures the newly configured initial DL BWP for the terminal device by using the higher layer signaling (for example, the RRC signaling). In addition, when a subcarrier spacing of the newly configured initial DL BWP is the same as a subcarrier spacing of the initial DL BWP configured in the SIB1, the frequency domain location of the first control resource set uses the CORESET #0 or the newly configured initial DL BWP as a reference.

If the initial DL BWP is configured in the SIB1 before the successful initial access of the terminal device, and the configuration of the first control resource set is in the another DL BWP, the following two cases (1) and (2) are included.

(1) If a frequency domain location of the another DL BWP includes a frequency domain location of the CORESET #0, or includes a frequency domain location of the initial DL BWP configured in the SIB1, and a subcarrier spacing of the another DL BWP is the same as the subcarrier spacing of the initial DL BWP configured in the SIB1, the frequency domain location of the first control resource set references a downlink bandwidth part referenced before the successful initial access.

(2) If a frequency domain location of the another DL BWP does not include a frequency domain location of the CORESET #0, or does not include a frequency domain location of the initial DL BWP configured in the SIB1, or a frequency domain location of the another DL BWP includes a frequency domain location of the CORESET #0, or includes a frequency domain location of the initial DL BWP configured in the SIB1, and a subcarrier spacing of the another DL BWP is different from the subcarrier spacing of the initial DL BWP configured in the SIB1, the another DL BWP is used as a reference.

It should be further noted that, when successfully receiving a message sent by the network device, the terminal device feeds back a 1-bit message to perform acknowledgement (ACK) or negative acknowledgement (NACK) on the received message. The network device determines, depending on whether the terminal device feeds back an ACK message (a bit value is 1) or a NACK message (a bit value is 0), whether to send new data or perform retransmission. An occasion of sending a message in the embodiments of this application may be an occasion of starting sending the message or an occasion of confirming that sending of the message is completed. This is not limited in this application. For example, the occasion that is of sending the acknowledgement message and that is designed in the embodiments in FIG. 3 to FIG. 15 may be an occasion of sending the acknowledgement message or an occasion of confirming that sending of the acknowledgement message is completed.

It should be further noted that, if the first control resource set is configured in the SIB1, the frequency domain resource location of the first control resource set is limited within a frequency domain resource range of the CORESET #0. That is, a frequency domain resource size of the first control resource set is less than or equal to a frequency domain resource size of the CORESET #0. If the first control resource set is not configured in the SIB1, but is configured in other higher layer signaling (for example, RRC signaling), a frequency domain resource location of the first control resource set may be within a frequency domain resource range of the CORESET #0, or may not be within a frequency domain resource range of the CORESET #0.

If a search space higher-layer parameter used for a random access channel is configured in the first downlink bandwidth part, when a frequency domain resource range of another downlink bandwidth part configured by the network device for the terminal device by using higher layer signaling (for example, RRC signaling) includes a frequency domain resource range of the first downlink bandwidth part after the successful initial access, and a subcarrier spacing of the another downlink bandwidth part is the same as a subcarrier spacing of the first downlink bandwidth part, if no search space higher-layer parameter used for the random access channel is configured in a current active downlink bandwidth part, the network device may configure, for the terminal device in the another downlink bandwidth part by using higher layer signaling (for example, RRC signaling), search space that is configured in the first downlink bandwidth part and that is used for a random access channel, and the terminal device monitors corresponding downlink control channel, for example, downlink control information scrambled by using an RA-RNTI, based on configuration information of the search space. An identifier of the current active downlink bandwidth part is a non-zero value. In this process, the terminal device does not need to change a radio frequency bandwidth or switch a carrier center frequency.

The foregoing mainly describes, from the perspective of the method, the solutions provided in the embodiments of this application. It may be understood that, to implement the foregoing functions, the terminal device and the network device include corresponding hardware structures and/or software modules for performing the functions. With reference to the steps of each example described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different devices to implement the described functions for each particular application, but it should not be considered that the implementation goes beyond the scope of the technical solutions in the embodiments of this application.

In the embodiments of this application, the terminal device and the network device may be divided into functional modules or functional units based on the foregoing methods. For example, each functional module or functional unit may be obtained through division based on each corresponding function, or two or more functions may be integrated into one processing module or processing unit. The integrated modules or units may be implemented in a form of hardware, or may be implemented in a form of a software functional module. It should be noted that, in this embodiment of this application, division into the modules or the units is an example, and is merely logical function division. During actual implementation, another division manner may be used.

Figure 16:
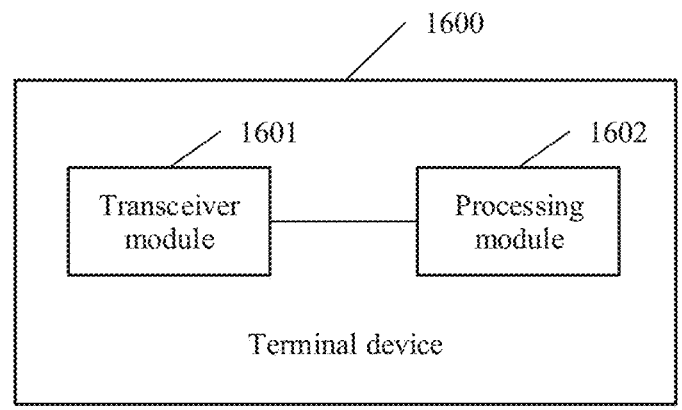
FIG. 16 is a schematic structural diagram of a terminal device according to an embodiment of this application.

FIG. 16 is a schematic structural diagram of a terminal device according to an embodiment of this application. The terminal device is configured to implement the embodiments in FIG. 3 to FIG. 15. As shown in FIG. 16, the terminal device 1600 includes a transceiver module 1601 and a processing module 1602.

In a first possible implementation solution, the transceiver module 1601 and the processing module 1602 are configured to implement content of the embodiments shown in FIG. 3 to FIG. 5. Details are as follows.

The transceiver module 1601 is configured to receive configuration information of a first control resource set before successful initial access of the terminal device.

The processing module 1602 is configured to monitor, based on a first common resource block set occupied by the first control resource set, a physical downlink control channel before the successful initial access of the terminal device or after the successful initial access of the terminal device, to obtain uplink or downlink scheduling control information.

A first start common resource block included in the first common resource block set is determined based on a second start common resource block of a first downlink bandwidth part and the configuration information of the first control resource set, and the configuration information is used to indicate where a physical resource block occupied by the first control resource set is located in the first downlink bandwidth part.

In a second possible implementation solution, the transceiver module 1601 and the processing module 1602 are configured to implement content of the embodiments shown in FIG. 9 to FIG. 11. Details are as follows.

The transceiver module 1601 is configured to receive configuration information of a first control resource set before successful initial access of the terminal device.

The processing module 1602 is configured to skip, before the successful initial access of the terminal device, monitoring a physical downlink control channel based on a common resource block set occupied by the first control resource set.

The processing module 1602 is further configured to monitor, based on a first common resource block set occupied by the first control resource set, the physical downlink control channel after the successful initial access of the terminal device, to obtain uplink or downlink scheduling control information.

A first start common resource block included in the first common resource block set is determined based on a second start common resource block of a first downlink bandwidth part and the configuration information of the first control resource set, and the configuration information is used to indicate where a physical resource block occupied by the first control resource set is located in the first downlink bandwidth part.

In a third possible implementation solution, the transceiver module 1601 and the processing module 1602 are configured to implement content of the embodiments shown in FIG. 12 and FIG. 13. Details are as follows.

The transceiver module 1601 is configured to receive configuration information of a first control resource set before successful initial access of the terminal device.

The processing module 1602 is configured to monitor, based on a first common resource block set occupied by the first control resource set, a physical downlink control channel before the successful initial access of the terminal device, to obtain uplink or downlink scheduling control information, where a first start common resource block included in the first common resource block set is determined based on a second start common resource block of a first downlink bandwidth part and the configuration information of the first control resource set, and the configuration information is used to indicate where a physical resource block occupied by the first control resource set is located in the first downlink bandwidth part.

The processing module 1602 is further configured to monitor, based on a third common resource block set occupied by the first control resource set, the physical downlink control channel after the successful initial access of the terminal device, to obtain the uplink or downlink scheduling control information, where a third start common resource block included in the third common resource block set is determined based on a fourth start common resource block of a second downlink bandwidth part and the configuration information of the first control resource set, and the configuration information is used to indicate where a physical resource block occupied by the first control resource set is located in the second downlink bandwidth part.

The second start common resource block of the first downlink bandwidth part is the same as the fourth start common resource block of the second downlink bandwidth part.

In a fourth possible implementation solution, the transceiver module 1601 and the processing module 1602 are configured to implement content of the embodiments shown in FIG. 14 and FIG. 15. Details are as follows.

The transceiver module 1601 is configured to receive configuration information of a first control resource set after successful initial access of the terminal device.

The processing module 1602 is configured to monitor, based on a first common resource block set occupied by the first control resource set, a physical downlink control channel after the successful initial access of the terminal device, to obtain uplink or downlink scheduling control information.

A first start common resource block included in the first common resource block set is determined based on a second start common resource block of a first downlink bandwidth part and the configuration information of the first control resource set, and the configuration information is used to indicate where a physical resource block occupied by the first control resource set is located in the first downlink bandwidth part.

It may be understood that the terminal device 1600 is configured to implement the steps performed by the terminal device in the embodiments in FIG. 3 to FIG. 15. For a specific implementation of the functional blocks included in the terminal device in FIG. 16 and corresponding beneficial effects, refer to the specific descriptions of the embodiments in FIG. 3 to FIG. 15. Details are not described herein.

In this embodiment of this application, the transceiver module may be a receiver or a receiver circuit. Alternatively, the transceiver module may be a communication interface of the terminal device. The processing module may be a processor.

Figure 17:
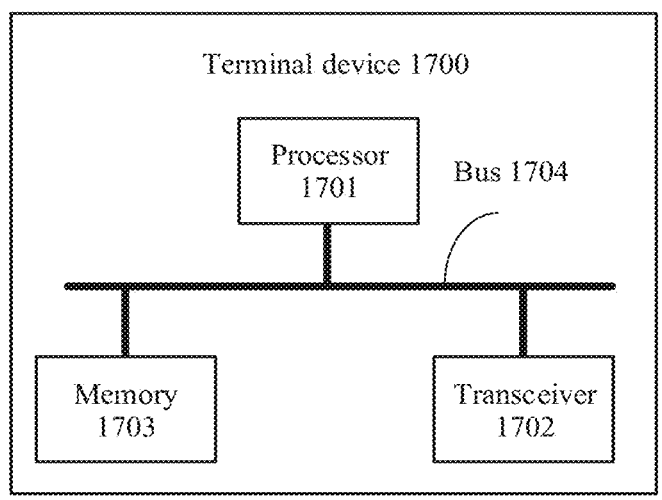
FIG. 17 is a schematic structural diagram of another terminal device according to an embodiment of this application.

The terminal device 1600 in the embodiment shown in FIG. 16 may be implemented by using a terminal device 1700 shown in FIG. 17. FIG. 17 is a schematic structural diagram of another terminal device according to an embodiment of this application. The terminal device 1700 shown in FIG. 17 includes a processor 1701 and a transceiver 1702.

The transceiver 1702 is configured to support information transmission between the terminal device 1700 and another terminal device or another device in the foregoing embodiments.

The processor 1701 is configured to control and manage an action of the terminal device.

For example, in the embodiment shown in FIG. 3, the transceiver 1702 is configured to receive the messages in steps 301, 302, and 303 in the embodiment shown in FIG. 3. The processor 1701 is configured to support the transceiver 1702 in performing the foregoing steps.

For example, in the embodiment shown in FIG. 9, the transceiver 1702 is configured to receive the messages in steps 901 and 902 in the embodiment shown in FIG. 9. The processor 1701 is configured to support the transceiver 1702 in performing the foregoing steps.

For example, in the embodiment shown in FIG. 12, the transceiver 1702 is configured to receive the messages in steps 1201, 1202, and 1203 in the embodiment shown in FIG. 12. The processor 1701 is configured to support the transceiver 1702 in performing the foregoing steps.

For example, in the embodiment shown in FIG. 14, the transceiver 1702 is configured to receive the messages in steps 1401 and 1402 in the embodiment shown in FIG. 14. The processor 1701 is configured to support the transceiver 1702 in performing the foregoing steps.

The processor 1701 and the transceiver 1702 are communicatively connected. For example, they are connected by using a bus 1704. The bus 1704 may be a PCI bus, an EISA bus, or the like. The bus 1704 may be classified into an address bus, a data bus, a control bus, and the like. For ease of representation, only one thick line is used to represent the bus in FIG. 17, but this does not mean that there is only one bus or only one type of bus.

The terminal device 1700 may further include a memory 1703. The memory 1703 is configured to store program code and data that are executed by the terminal device 1700. The processor 1701 is configured to execute the application program code stored in the memory 1703, to implement an action of the terminal device provided in any one of the embodiments shown in FIG. 3 to FIG. 15.

It should be noted that, during actual application, the terminal device may include one or more processors, and a structure of the terminal device 1700 does not constitute a limitation on this embodiment of this application.

The processor 1701 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors or a combination of the DSP and a microprocessor.

The transceiver 1702 may be a communication interface, a transceiver circuit, or the like. The transceiver is a general term. During specific implementation, the transceiver may include a plurality of interfaces.

The memory 1703 may include a transitory memory, for example, a random access memory (RAM). The memory 1703 may alternatively include a non-transitory memory, for example, a read-only memory (ROM), a flash memory, a hard disk drive (HDD), or a solid-state drive (SSD). The memory 1703 may alternatively include a combination of the foregoing types of memories.

An embodiment of this application further provides a computer storage medium. The computer storage medium may be configured to store computer software instructions used by the terminal device in the embodiment shown in FIG. 17. The computer software instructions include a program designed for use by the terminal device to implement the foregoing embodiments. The storage medium includes but is not limited to a flash memory, a hard disk, or a solid-state drive.

An embodiment of this application further provides a computer program product. When the computer product is run by a computing device, data processing designed for the terminal device in the embodiment shown in FIG. 17 may be performed.

Figure 18:
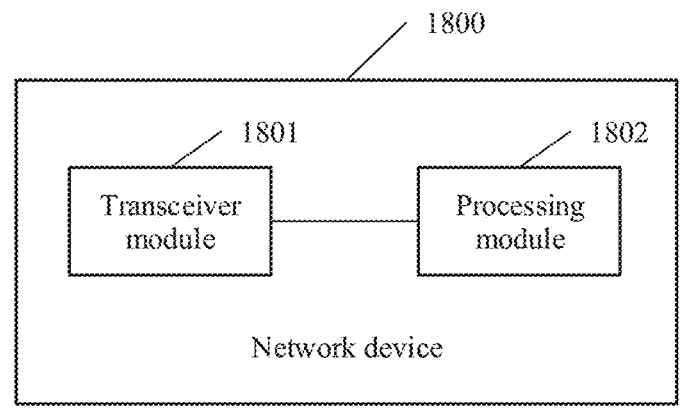
FIG. 18 is a schematic structural diagram of a network device according to an embodiment of this application.

FIG. 18 is a schematic structural diagram of another network device according to an embodiment of this application. The network device is configured to implement the embodiments in FIG. 3 to FIG. 15. As shown in FIG. 18, the network device 1800 includes a transceiver module 1801 and a processing module 1802.

In a first possible implementation solution, the transceiver module and the processing module are configured to implement content of the embodiments shown in FIG. 3 to FIG. 5.

The transceiver module 1801 is configured to send configuration information of a first control resource set to a terminal device before successful initial access of the terminal device.

The processing module 1802 is configured to broadcast, based on a first common resource block set occupied by the first control resource set, uplink or downlink scheduling control information on a physical downlink control channel before the successful initial access of the terminal device or after the successful initial access of the terminal device.

A first start common resource block included in the first common resource block set is determined based on a second start common resource block of a first downlink bandwidth part and the configuration information of the first control resource set, and the configuration information is used to indicate where a physical resource block occupied by the first control resource set is located in the first downlink bandwidth part.

In a second possible implementation solution, the transceiver module and the processing module are configured to implement content of the embodiments shown in FIG. 9 to FIG. 11. Details are as follows.

The transceiver module 1801 is configured to send configuration information of a first control resource set to a terminal device before successful initial access of the terminal device.

The processing module 1802 is configured to skip, before the successful initial access of the terminal device, broadcasting uplink or downlink scheduling control information on a physical downlink control channel based on a common resource block set occupied by the first control resource set.

The processing module 1802 is further configured to broadcast, after the successful initial access of the terminal device, the uplink or downlink scheduling control information on the physical downlink control channel based on a first common resource block set occupied by the first control resource set.

A first start common resource block included in the first common resource block set is determined based on a second start common resource block of a first downlink bandwidth part and the configuration information of the first control resource set, and the configuration information is used to indicate where a physical resource block occupied by the first control resource set is located in the first downlink bandwidth part.

In a third possible implementation solution, the transceiver module and the processing module are configured to implement content of the embodiments shown in FIG. 12 and FIG. 13. Details are as follows.

The transceiver module 1801 is configured to send configuration information of a first control resource set to a terminal device before successful initial access of the terminal device.

The processing module 1802 is configured to broadcast, based on a first common resource block set occupied by the first control resource set, uplink or downlink scheduling control information on a physical downlink control channel before the successful initial access of the terminal device, where a first start common resource block included in the first common resource block set is determined based on a second start common resource block of a first downlink bandwidth part and the configuration information of the first control resource set, and the configuration information is used to indicate where a physical resource block occupied by the first control resource set is located in the first downlink bandwidth part.

The processing module 1802 is further configured to broadcast, after the successful initial access of the terminal device, the uplink or downlink scheduling control information on the physical downlink control channel based on a third common resource block set occupied by the first control resource set, where a third start common resource block included in the third common resource block set is determined based on a fourth start common resource block of a second downlink bandwidth part and the configuration information of the first control resource set, and the configuration information is used to indicate where a physical resource block occupied by the first control resource set is located in the second downlink bandwidth part.

The second start common resource block of the first downlink bandwidth part is the same as the fourth start common resource block of the second downlink bandwidth part.

In a fourth possible implementation solution, the transceiver module and the processing module are configured to implement content of the embodiments shown in FIG. 14 and FIG. 15. Details are as follows.

The transceiver module 1801 is configured to send configuration information of a first control resource set to a terminal device after successful initial access of the terminal device.

The processing module 1802 is configured to broadcast, based on a first common resource block set occupied by the first control resource set, uplink or downlink scheduling control information on a physical downlink control channel after the successful initial access of the terminal device, where a first start common resource block included in the first common resource block set is determined based on a second start common resource block of a first downlink bandwidth part and the configuration information of the first control resource set, and the configuration information is used to indicate where a physical resource block occupied by the first control resource set is located in the first downlink bandwidth part.

It may be understood that the network device 1800 is configured to implement the steps performed by the network device in the embodiments in FIG. 3 to FIG. 15. For a specific implementation of the functional blocks included in the network device in FIG. 18 and corresponding beneficial effects, refer to the specific descriptions of the embodiments in FIG. 3 to FIG. 15. Details are not described herein.

In this embodiment of this application, the transceiver module may be a receiver or a receiver circuit. Alternatively, the transceiver module may be a communication interface of the network device. The processing module may be a processor.

Figure 19:
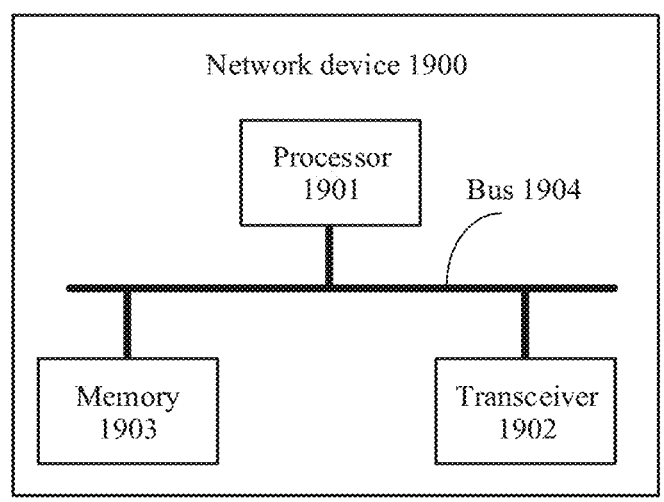
FIG. 19 is a schematic structural diagram of another network device according to an embodiment of this application.

The network device shown in FIG. 18 may be implemented by using a network device 1900 shown in FIG. 19. FIG. 19 is a schematic structural diagram of another network device according to an embodiment of this application. The network device 1900 shown in FIG. 19 includes a processor 1901 and a transceiver 1902.

The transceiver 1902 is configured to support information transmission between the network device 1900 and another device in the foregoing embodiments, and the processor 1901 is configured to control and manage an action of the network device 1900.

For example, in the embodiment shown in FIG. 3, the transceiver 1902 is configured to send the messages in steps 301, 302, and 303 in the embodiment shown in FIG. 3. The processor 1901 is configured to support the transceiver 1902 in performing the foregoing steps.

For example, in the embodiment shown in FIG. 9, the transceiver 1902 is configured to send the messages in steps 901 and 902 in the embodiment shown in FIG. 9. The processor 1901 is configured to support the transceiver 1902 in performing the foregoing steps.

For example, in the embodiment shown in FIG. 12, the transceiver 1902 is configured to send the messages in steps 1201, 1202, and 1203 in the embodiment shown in FIG. 12. The processor 1901 is configured to support the transceiver 1902 in performing the foregoing steps.

For example, in the embodiment shown in FIG. 14, the transceiver 1902 is configured to send the messages in steps 1401 and 1402 in the embodiment shown in FIG. 14. The processor 1901 is configured to support the transceiver 1902 in performing the foregoing steps.

The processor 1901 and the transceiver 1902 are communicatively connected. For example, they are connected by using a bus 1904. The network device 1900 may further include a memory 1903. The memory 1903 is configured to store program code and data that are executed by the network device 1900. The processor 1901 is configured to execute the application program code stored in the memory 1903, to implement an action of the network device provided in any embodiment shown in FIG. 8 or FIG. 9.

It should be noted that, during actual application, the network device may include one or more processors, and a structure of the network device 1900 does not constitute a limitation on this embodiment of this application.

The processor 1901 may be a CPU, an NP, a hardware chip, or any combination thereof. The hardware chip may be an ASIC, a PLD, or a combination thereof. The PLD may be a CPLD, an FPGA, a GAL, or any combination thereof.

The memory 1903 may include a volatile memory such as a RAM. The memory 1903 may alternatively include a non-volatile memory such as a ROM, a flash memory, a hard disk drive, or a solid-state drive. The memory 1903 may alternatively include a combination of the foregoing types of memories.

An embodiment of this application further provides a computer storage medium. The computer storage medium may be configured to store computer software instructions used by the network device in the embodiment shown in FIG. 18. The computer software instructions include a program designed for use by the network device to implement the foregoing embodiments. The storage medium includes but is not limited to a flash memory, a hard disk, or a solid-state drive.

An embodiment of this application further provides a computer program product. When the computer product is run by a computing device, a data processing device designed for the network device in the embodiment shown in FIG. 18 may be performed.

In the specification, claims, and accompanying drawings of this application, the terms "first", "second", "third", "fourth" and the like are intended to distinguish between different objects but do not indicate a particular order. In addition, the terms "including", "having", or any other variant thereof, are intended to cover non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

In this application, "A and/or B" refers to one of the following cases: A, B, and A and B. "At least one of" means the listed items or any combination of any quantity of the listed items. For example, "at least one of A, B, and C" means any one of the seven cases: A, B, C, A and B, B and C, A and C, and A, B, and C.

A person of ordinary skill in the art may understand that sequence numbers of the foregoing processes do not mean execution sequences in various embodiments of this application. The execution sequences of the processes should be determined based on functions and internal logic of the processes, and should not constitute any limitation on the implementation processes of the embodiments of this application.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer readable storage medium or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the processes of the methods in the embodiments may be completed by a computer program instructing relevant hardware. The program may be stored in a computer-readable storage medium. When the program is executed, the processes of the method embodiments may be included. The foregoing storage medium may be a magnetic disk, an optical disc, a read-only memory (ROM), a random access memory (RAM), or the like.

What is claimed is:

1. A method, comprising:
    receiving, by an apparatus, configuration information of a first common control resource set before successful initial access of the apparatus, wherein the configuration information indicates where a physical resource block occupied by the first common control resource set is located in a first downlink bandwidth part, and wherein the first downlink bandwidth part is configured by system information block 1 (SIB1) and takes effect after the successful initial access of the apparatus; and
    monitoring, by the apparatus, a physical downlink control channel in the first common control resource set before the successful initial access of the apparatus, to obtain uplink scheduling control information or downlink scheduling control information, wherein
    a start common resource block of the first common control resource set is determined based on a start common resource block of the first downlink bandwidth part and the configuration information of the first common control resource set.

2. The method according to claim 1, wherein the first downlink bandwidth part is different from an initial downlink bandwidth part defined by control resource set 0 (CORESET #0).

3. The method according to claim 2, wherein the initial downlink bandwidth part defined by CORESET #0 takes effect before successful initial access of a terminal device.

4. The method according to claim 3, wherein the successful initial access of the apparatus indicates one of the following occasions:
    an occasion on which the apparatus successfully receives an initially transmitted message 4 and sends an acknowledgement message to a network device;
    an occasion on which the apparatus successfully receives, after the apparatus successfully receives an initially transmitted message 4, downlink control information (DCI) scrambled by a cell radio network temporary identifier (C-RNTI);
    an occasion on which the apparatus successfully receives a retransmitted message 4 and sends an acknowledgement message to a network device;
    an occasion on which the apparatus successfully receives, after the apparatus successfully receives a retransmitted message 4, DCI scrambled by a C-RNTI;
    an occasion on which the apparatus successfully receives, after successfully receiving an initially transmitted message 4, configuration information indicating that DCI scrambled by a C-RNTI needs to be blindly detected;
    an occasion on which the apparatus successfully receives, after successfully receiving a retransmitted message 4, configuration information indicating that DCI scrambled by a C-RNTI needs to be blindly detected; or
    an occasion on which the apparatus switches from the initial downlink bandwidth part defined by using CORESET #0 to the first downlink bandwidth part configured by the SIB1 after successfully receiving an initially transmitted message 4 or a retransmitted message 4.

5. The method according to claim 1, further comprising:
    monitoring, by the apparatus, a physical downlink control channel in the first common control resource set after the successful initial access of the apparatus, to obtain uplink scheduling control information or downlink scheduling control information.

6. The method according to claim 1, wherein an identifier of the first common control resource set is not 0.

7. The method according to claim 1, wherein the uplink scheduling control information or downlink scheduling control information may be control information for scheduling a random access response, control information for scheduling a paging message, or control information for scheduling a system message.

8. An apparatus, comprising:
    one or more processors configured to:
    receive configuration information of a first common control resource set before successful initial access of the apparatus, wherein the configuration information indicates where a physical resource block occupied by the first common control resource set is located in a first downlink bandwidth part, and wherein the first downlink bandwidth part is configured by system information block 1 (SIB1) and takes effect after the successful initial access of the apparatus; and
    monitor a physical downlink control channel in the first common control resource set before the successful initial access of the apparatus, to obtain uplink scheduling control information or downlink scheduling control information, wherein
    a start common resource block of the first common control resource set is determined based on a start common resource block of the first downlink bandwidth part and the configuration information of the first common control resource set.

9. The apparatus according to claim 8, wherein the first downlink bandwidth part is different from an initial downlink bandwidth part defined by control resource set 0 (CORESET #0).

10. The apparatus according to claim 9, wherein the initial downlink bandwidth part defined by CORESET #0 takes effect before successful initial access of the apparatus.

11. The apparatus according to claim 8, wherein the successful initial access of the apparatus indicates one of the following occasions:
    an occasion on which the apparatus successfully receives an initially transmitted message 4 and sends an acknowledgement message to a network device;
    an occasion on which the apparatus successfully receives, after the apparatus successfully receives an initially transmitted message 4, downlink control information (DCI) scrambled by a cell radio network temporary identifier (C-RNTI);
    an occasion on which the apparatus successfully receives a retransmitted message 4 and sends an acknowledgement message to a network device;
    an occasion on which the apparatus successfully receives, after the apparatus successfully receives a retransmitted message 4, DCI scrambled by a C-RNTI;
    an occasion on which the apparatus successfully receives, after successfully receiving an initially transmitted message 4, configuration information indicating that DCI scrambled by a C-RNTI needs to be blindly detected;
    an occasion on which the apparatus successfully receives, after successfully receiving a retransmitted message 4, configuration information indicating that DCI scrambled by a C-RNTI needs to be blindly detected; or
    an occasion on which the apparatus switches from an initial downlink bandwidth part defined by using CORESET #0 to the first downlink bandwidth part configured by the SIB1 after successfully receiving an initially transmitted message 4 or a retransmitted message 4.

12. The apparatus according to claim 8, wherein the one or more processors further configured to:
monitor a physical downlink control channel in the first common control resource set after the successful initial access of the apparatus, to obtain uplink scheduling control information or downlink scheduling control information.

13. The apparatus according to claim 8, wherein the uplink scheduling control information or downlink scheduling control information may be control information for scheduling a random access response, control information for scheduling a paging message, or control information for scheduling a system message.

14. A method, comprising:
sending, by an apparatus, configuration information of a first common control resource set before successful initial access of a terminal device, wherein the configuration information indicates where a physical resource block occupied by the first common control resource set is located in a first downlink bandwidth part, and wherein the first downlink bandwidth part is configured by system information block 1 (SIB1) and takes effect after the successful initial access of the terminal device; and
sending, by the apparatus, uplink scheduling control information or downlink scheduling control information on a physical downlink control channel in the first common control resource set before the successful initial access of the terminal device.

15. The method according to claim 14, wherein the first downlink bandwidth part is different from an initial downlink bandwidth part defined by control resource set 0 (CORESET #0).

16. The method according to claim 15, wherein the initial downlink bandwidth part defined by CORESET #0 takes effect before successful initial access of the terminal device.

17. The method according to claim 14, wherein a start common resource block of the first common control resource set is determined based on a start common resource block of the first downlink bandwidth part and the configuration information of the first common control resource set.

18. The method according to claim 14, wherein the successful initial access of the terminal device is used to indicate one of the following occasions:
an occasion on which the apparatus receives an acknowledgement message that is sent by the terminal device and that is for an initially transmitted message 4 sent by the apparatus;
an occasion on which the apparatus receives an acknowledgement message that is sent by the terminal device and that is for a retransmitted message 4 sent by the apparatus;
an occasion on which the apparatus sends, to the terminal device after receiving an acknowledgement message that is sent by the terminal device and that is for an initially transmitted message 4 sent by the apparatus, configuration information used to indicate that DCI scrambled by using a C-RNTI needs to be blindly detected;
an occasion on which the apparatus sends, to the terminal device after receiving an acknowledgement message that is sent by the terminal device and that is for a retransmitted message 4 sent by the apparatus, configuration information used to indicate that DCI scrambled by using a C-RNTI needs to be blindly detected; or
an occasion on which the terminal device switches from an initial downlink bandwidth part defined by using CORESET #0 to the first downlink bandwidth part configured by the SIB1 after successfully receiving an initially transmitted message 4 or a retransmitted message 4.

19. The method according to claim 14, further comprising:
sending, by the apparatus, uplink scheduling control information or downlink scheduling control information on a physical downlink control channel in the first common control resource set after the successful initial access of the terminal device.

20. The method according to claim 14, wherein the uplink scheduling control information or downlink scheduling control information may be control information for scheduling a random access response, control information for scheduling a paging message, or control information for scheduling a system message.

* * * * *